United States Patent [19]

Takeda et al.

[11] 4,345,054

[45] Aug. 17, 1982

[54] HIGH-MOLECULAR-WEIGHT NOVOLAK TYPES SUBSTITUTED PHENOLIC RESINS AND PROCESS FOR PREPARATION THEREOF

[75] Inventors: Nobuyuki Takeda; Tadao Iwata, both of Iwakuni, Japan

[73] Assignee: Mitsui Petrochemical Industries, Ltd., Tokyo, Japan

[21] Appl. No.: 221,333

[22] Filed: Dec. 29, 1980

[30] Foreign Application Priority Data

Dec. 27, 1979 [JP] Japan ................................ 54-169140
Jun. 3, 1980 [JP] Japan ................................ 55-73754
Jun. 3, 1980 [JP] Japan ................................ 55-73755
Jun. 3, 1980 [JP] Japan ................................ 55-73756
Jun. 3, 1980 [JP] Japan ................................ 55-73757

[51] Int. Cl.$^3$ ............................................. C08L 61/14
[52] U.S. Cl. .................................. 525/480; 525/422; 525/442; 525/456; 525/481; 525/491; 525/495; 525/497; 525/501; 525/503; 528/127; 528/138; 528/139
[58] Field of Search ................. 525/501, 480, 503; 528/127, 138, 139

[56] References Cited

U.S. PATENT DOCUMENTS

| Re. 26,881 | 5/1970 | Kreibich et al. | 525/480 |
|---|---|---|---|
| 4,076,692 | 2/1978 | Batha et al. | 525/503 |
| 4,239,869 | 12/1980 | Annis | 525/503 |
| 4,260,704 | 4/1981 | Schmidt et al. | 525/501 |

*Primary Examiner*—Theodore E. Pertilla
*Attorney, Agent, or Firm*—Sherman & Shalloway

[57] ABSTRACT

A high-molecular-weight novolak type substituted phenolic resin having a number average molecular weight of at least 1500 is prepared by reacting (A) (i) a phenol comprised mainly of a bifunctional phenol or (ii) a low-molecular-weight novolak type substituted phenolic resin derived from this phenol and an aldehyde with (B) a chain extender selected from the group consisting of (i) a dimethylolated product of a bifunctional or trifunctional phenol, (ii) a low-molecular-weight resol type substituted phenolic resin derived from a phenol comprised mainly of a bifunctional phenol and an aldehyde, (iii) an aldehyde, (iv) a ketone, (v) a diol and (vi) a dihalide in the presence of an acid catalyst, with the proviso that if the reactant (A) is the phenol (i), the chain extender is the resol type substituted phenolic resin (ii).

The molecular weight of this novolak type substituted phenolic resin is much higher than the molecular weights of conventional novolak type phenolic resins, and if this phenolic resin is incorporated into various setting type resins, the heat resistance and mechanical properties of these resins can remarkably be improved.

56 Claims, No Drawings

HIGH-MOLECULAR-WEIGHT NOVOLAK TYPES SUBSTITUTED PHENOLIC RESINS AND PROCESS FOR PREPARATION THEREOF

BACKGROUND OF THE INVENTION (1) Field of the Invention

The present invention relates to a substantially linear, high-molecular-weight, novel novolak type substituted phenolic resin and a process for the preparation thereof. More particularly, the present invention relates to a substantially linear, high-molecular-weight, novel novolak type phenolic resin which provides composition excellent in the heat resistance and mechanical properties when incorporated in various setting resins and which can be used in various fields.

(2) Description of the Prior Art

Ordinarily, novolak type phenolic resins are prepared by condensing a phenol with an aldehyde in the presence of an acid catalyst, and it is known that the obtained resins have a structure in which phenol units are connected through methylene groups bonded at the 2,6- or 2,4-positions thereof and in which methylol groups are not contained or if contained, the amounts of the methylol groups are very small. Novolak type phenolic resins prepared according to this known process ordinarily have a number average molecular weight of 250 to 800 and the number average molecular weight is about 1000 at highest, and also the melting points of these novolak type phenolic resins are low. Furthermore, it is known that a novolak type substituted phenolic resin having a structure similar to that of the above-mentioned novolak type phenolic resin is obtained by condensing a substituted phenol having an alkyl group or halogen atom at the para- or ortho-position of the phenol nucleus with an aldehyde in the presence of an acid catalyst. However, the number average molecular weight of this phenolic resin is similarly low and ordinarily in the range of from 250 to 800, and is 1200 at highest. Accordingly, the melting point of this phenolic resin is low. Therefore, even if this novolak type substituted resin is incorporated into other various setting resins optionally with a filler or additive and the resulting compositions are cured, there cannot be obtained cured resin compositions excellent in the heat resistance and mechanical properties, as in the case of the above-mentioned novolak phenolic resin.

As is seen from the above description, the number average molecular weights of novolak type phenol-formaldehyde resins prepared according to the conventional processes are very low and are ordinarily in the range of from 250 to 800 and 1200 at highest. It was reported that when such novolak type phenol-formaldehyde having a low number average molecular weight is fractionated, a novolak type phenol-formaldehyde resin having a molecular weight of about 3000 to about 10000 is obtained though the content is very low [see Lectures on Plastic Materials, Volume 15, Phenolic Resins, pages 14-24, written by Shinichi Murayama and published by Nikkan Kogyo Shinbunsha and J. J. Gardikes and F. M. Konrad, Am. Chem. Soc., Div. Org. Coating and Plastic Chemistry, 26, No. 1, 131-137 (1966)]. However, since a high-molecular-weight novolak type phenol-formaldehyde resin obtained by fractionation has a narrow molecular weight distribution and a gelation product is readily formed by partial crosslinking owing to the trifunctional characteristic of the phenol and is contained in the obtained resin, even if such phenolic resin is incorporated in a setting resin, it is impossible to sufficiently improve the heat resistance and mechanical properties in the resulting resin composition. Furthermore, the process for preparing such high-molecular-weight novolak type phenol-aldehyde resin, disclosed in the above references, that is, the process comprising fractionating a novolak type phenol-formaldehyde resin having a low number average molecular weight to obtain a high-molecular-weight novolak phenol-formaldehyde resin contained in a minute amount, is not advantageous from the industrial viewpoint.

Attempts have been made to obtain a high-molecular-weight novolak type substituted phenolic resin by polycondensing a bifunctional alkyl phenol with an o-alkyl or p-alkyl phenol with an aldehyde in the presence of an acid catalyst. However, the number average molecular weight of the so obtained novolak type alkyl-substituted phenolic resin is up to 1200, and a novolak type alkyl-substituted phenolic resin having a sufficiently high number average molecular weight has not been obtained [see, for example, F. S. Granger, Industrial and Engineering Chemistry, 29, 860–866 (1937), J. B. Niederl and I. W. Ruderman, Journal of American Chemical Society, 67, pages 1176–1177 (1945), and R. F. Hunter and V. Vand, Journal of Applied Chemistry (London), 1, page 298 (1951)]. Novolak type alkyl-substituted phenolic resins have a low number average molecular weight and a low melting point, though they have a chain-like or linear structure.

Also attempts have been made to obtain a high-molecular-weight novolak type chlorophenol resin by polycondensing p-chlorophenol or o-chlorophenol with formaldehyde in the presence of an acid catalyst. For example, W. J. Burke and S. H. Ruteman et al, Journal of Polymer Science, 20, 75–88 (1956) discloses that a high-molecular-weight novolak type chlorophenol resin having a number average molecular weight higher 1600 or 3300 is obtained by polycondensing p-chlorophenol with formaldehyde; W. J. Burke and S. H. Ruteman, Journal of Polymer Science, 32, pages 221–228 (1958) discloses that a high-molecular-weight novolak type chlorophenol resin having a number average molecular weight higher 1610 or 3640 is obtained by similarly polycondensing p-chlorophenol with formaldehyde and acetylating the resulting reaction product. However, these high-molecular-weight novolak type chlorophenol resins have been denied by researches made afterwards and it has been proved that the acetylation product is a low-molecular-weight novolak type chlorophenol resin having a number average molecular weight lower than 1250 [Minoru Imoto and Keikichi Uno, Lectures on Polymerization Reactions, Volume 8, Polyaddition and Addition Condensation (published by Kagaku Dojin) and Minoru Imoto and Shinichi Nakade, Bulletin of Chemical Society of Japan, 36, pages 580-585 (1963)]. In short, novolak type chlorophenol resins disclosed in these prior art references have a low number average molecular weight and a low melting point though they have a chain-like or linear molecular structure, and even if these novolak type chlorophenol resins are incorporated in setting resins to form resin compositions, it is impossible to sufficiently improve the heat resistance and mechanical properties as in the case of other novolak type phenolic resin described above.

Japanese Patent Application Laid-Open Specification No. 116081/79 teaches that a phenol and an aldehyde are subjected to addition condensation in the presence of an acid catalyst and a Lewis acid is added to effect removal of the phenol at an appropriate time during a period of from the point before completion of the reaction to the point after removal of condensed water, whereby a linear novolak type phenolic resin free of a three-dimensional crosslinked structure (gelation product) is obtained. In Examples of this specification, only phenol is used as the phenol, but in the text of the specification, it is taught that not only phenol but also alkyl phenols such as cresol and p-tert-butylphenol can be used as the phenol. We made the tracing experiments of Examples of this laid-open specification, and found that each of the obtained novolak type phenol-formaldehyde resin contains a considerable amount of a three-dimensional crosslinked structure (gelation product) and the number average molecular weight of the residue left after removal of the gelation product is in the range of from about 500 to about 1100 and this residue is a low-molecular-weight novolak type phenolic resin (see Comparative Example 4 given hereinafter). This is quite obvious if it is taken into account that even when dehydration condensation of a low-molecular-weight novolak type phenolic resin is conducted for a long time, if a component capable of extending the chain is not present in the reaction system, increase of the molecular weight should naturally be limited.

BRIEF SUMMARY OF THE INVENTION

We found that if a phenol comprised mainly of a bi-functional phenol is reacted with a resol type phenolic resin derived from a phenol comprised mainly of a bifunctional phenol and an aldehyde in the presence of an acid catalyst or if a novolak type substituted phenolic resin derived from a phenol comprised mainly of a bi-functional phenol and an aldehyde is reacted with a chain extender described hereinafter, such as a dimethylolated product of a phenol, a resol type substituted phenolic resin, an aldehyde, a ketone, a diol or a dihalide in the presence of an acid catalyst, there can be obtained a substantially linear, high-molecular-weight novolak type substituted phenolic resin having a number average molecular weight of at least 1500.

It also was found that when this substantially linear, high-molecular-weight, high-melting-point, novolak type substituted phenolic resin is incorporated into various setting type resins such as epoxy resins and phenolic resins and the compositions are cured, there can be obtained cured compositions highly improved in the heat resistance and mechanical properties.

In accordance with one fundamental aspect of the present invention, there is provided a process for the preparation of high-molecular-weight novolak type substituted phenolic resins, which comprises reacting (A) (i) a phenol comprised mainly of at least one bifunctional phenol represented by the following general formula [I]:

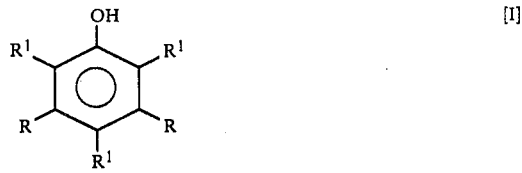

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, or (ii) a novolak type substituted phenolic resin consisting of a phenol comprised mainly of said bifunctional phenol and an aldehyde represented by the following general formula:

$$R^2-CHO \qquad [II]$$

wherein $R^2$ stands for a hydrogen atom or a substituent selected from the group consisting of a methyl group and a halogenated methyl group, and having a number average molecular weight of from 250 to 1200, with (B) a chain extender selected from the group consisting of (i) dimethylolated products of bi-functional and trifunctional phenols, (ii) resol type substituted phenolic resins consisting of a phenol comprised mainly of said bifunctional phenol and said aldehyde and having a number average molecular weight of from 250 to 1200, (iii) aldehydes, (iv) ketones, (v) diols and (vi) dihalides, with the proviso that when the reactant (A) is the phenol (i), the chain extender (B) is the resol type substituted phenol resin (ii), in the presence of an acid catalyst, so that at least 70 mole % of the phenol component in the final novolak type substituted phenolic resin is occupied by said bifunctional phenol, until the number average molecular weight of the final novolak type substituted phenolic resin is at least 1500 as measured by the vapor pressure osmometry in N,N-dimethylacetamide as the solvent.

In accordance with another aspect of the present invention, there is provided a substantially linear, high-molecular-weight novolak type substituted phenolic resin which comprises substantially linear novolak type recurring units formed by condensation of a phenol component containing at least 70 mole % of at least one bifunctional phenol represented by the following general formula [I]:

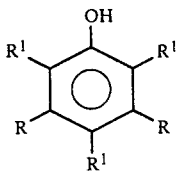

[I]

wherein two of three R[1]'s are hydrogen atoms and the remaining one R[1] is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, with at least one aldehyde component represented by the following general formula [II]:

  [II]

wherein $R^2$ stands for a hydrogen atom or a substituent selected from the group consisting of a methyl group and a halogenated methyl group, wherein said resin may contain intervening groups consisting of a divalent hydrocarbon group, which appear alternately in blocks of said novolak type recurring units having a number average molecular weight of 250 to 1200, in an amount of 0.5 to 1 mole per mole of said blocks and said resin has a number average molecular weight of at least 1500 as measured by the vapor pressure osmometry in N,N-dimethylacetamide as the solvent.

The present invention will now be described in detail.

The high-molecular-weight novolak type substituted phenolic resin (hereinafter referred to as "high-molecular-weight novolak type resin") according to the present invention may be comprised of novolak type recurring units, all of which are substantially linear or it may contain intervening or bridging groups consisting of a divalent hydrocarbon group, which appear alternately in blocks of the novolak type recurring units having a number average molecular weight of 250 to 1200, in an amount of 0.5 to 1 mole per mole of said blocks. What is important is that this high-molecular-weight novolak type resin is substantially linear and has a number average molecular weight of at least 1500.

By the term "substantially linear" used herein, it is meant that the molecular structure of the polymer is a linear structure including straight or branched chains but is substantially free of crosslinkages (gelled portions). The number average molecular weight of the substantially linear high-molecular-weight novolak type resin is one as determined according to the vapor pressure osmometry in N,N-dimethylacetamide as the solvent, and it is indispensable that the number average molecular weight thus determined should be at least 1500. If the number average molecular weight of the high-molecular-weight novolak type resin is in the range of from 1,700 to 15,000, when the resin is used as an additive to a setting type resin, the heat resistance and mechanical properties are improved, and these improving effects are especially enhanced if the number average molecular weight of the high-molecular-weight novolak type resin is in the range of from 2,000 to 10,000.

As pointed out above, it is indispensable that the high-molecular-weight novolak type resin should have a number average molecular weight of at least 1500. In general, a higher number average molecular weight is preferred, because the heat resistance and mechanical properties of a composition formed by incorporating this resin into a setting type resin are improved as the number average molecular weight of the resin is increased. The molecular weight distribution of the high-molecular-weight novolak type resin of the present invention is such that the content of resin components having a number average molecular weight of at least 2,000 is ordinarily at least 50% by weight, preferably at least 60% by weight and especially preferably at least 70%. The molecular weight distribution expressed as the ratio $\bar{M}w/\bar{M}n$ of the weight average molecular weight $\bar{M}w$ to the number average molecular weight $\bar{M}n$ is preferably in the range of from 1.8 to 20 and especially preferably in the range of from 2 to 10. The melting point of the high-molecular-weight novolak type resin is ordinarily higher than 120° C. and preferably higher than 150° C.

In the bifunctional phenol of the general formula [I] forming the novolak type recurring units, $R^1$ other than the hydrogen atoms is preferably an alkyl group having 1 to 8 carbon atoms and is especially preferably one substituent selected from the group consisting of methyl, ethyl, isopropyl, sec-butyl, tert-butyl and octyl groups. A methyl group is most preferred.

In the general formula [I], one of two groups R is preferably a hydrogen atom and the other group R is preferably a hydrogen atom or an alkyl group having 1 to 8 carbon atoms, and it is especially preferred that each of the two groups R be a hydrogen atom.

The phenol forming novolak type recurring units comprises 70 to 100 mole %, preferably 80 to 100 mole %, especially preferably 90 to 100 mole %, of at least one bifunctional phenol represented by the general formula [I] and up to 30 mole %, preferably up to 20 mole %, especially preferably up to 10 mole %, of a trifunctional phenol (the total amount of both the phenols being 100 mole %).

In the aldehyde of the general formula [II] forming novolak type recurring units, the group $R^2$ is preferably a hydrogen atom or a methyl group and is especially preferably a hydrogen atom.

In the novolak type recurring units, the bifunctional phenol represented by the general formula [I] is present in the polymer molecule chain in the form of hydroxyarylene units represented by the following general formula [IV]:

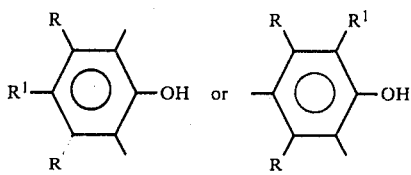

wherein $R^1$ and R are as defined above,
and the bifunctional phenol of the general formula [I] is present at terminals of the polymer molecule chain in the form of hydroxyaryl units represented by the following general formula [V]:

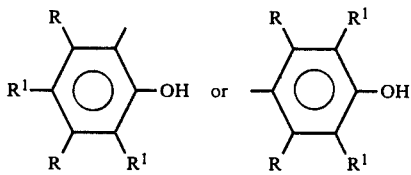

wherein $R^1$ and R are as defined above.
Also the trifunctional phenol of the resin is present in the polymer molecule chain in the form of hyroxyarylene units similar to those represented by the general formula [IV] and is present at terminals of the resin molecule in the form of hydroxyaryl units similar to those represented by the general formula [V].

In the high-moleculer-weight novolak type resin of the present invention, the aldehyde represented by the general formula [II] is present in the novolak recurring units in the form of alkylidene units represented by the following general formula [VI]:

wherein $R^2$ stands for a hydrogen atom or a substituent selected from the group consisting of methyl and halogenated methyl groups.

The novolak type recurring units (a) constituting the high-molecular-weight novolak type resin of the present invention form a substantially linear chain structure in which the above-mentioned hydroxyarylene units and alkylidene units are alternately arranged and connected with one another. More specifically, the structure of the novolak type recurring units (a) constituting the high-molecular-weight novolak type resin of the present invention is such that when the phenol is comprised solely of the bifunctional phenol represented by the general formula [I], the resin is linear and if the content of the trifunctional phenol is increased, the resin sometimes has a branched structure. The ratio of the aldehyde component to the total phenol component in the novolak type recurring units is such that the amount of the aldehyde component is ordinarily in the range of from 0.90 to 1.0 mole, preferably from 0.93 to 1.0 mole, per mole of the total phenol component. Ordinarily, the novolak type recurring units (a) are free of a methylol group, but they may comprise a methylol group in a minute amount, for example, up to 0.01 mole per mole of the total phenol component.

In the phenol component in the novolak type recurring units (a) constituting the high-molecular-weight novolak type resin of the present invention, the bifunctional phenol is a phenol represented by the above general formula [I] having on the benzene nucleus two hydrogen atoms active to the substitution reaction. More specifically, the bifunctional phenol is a phenol of the general formula [I] which has an alkyl group having 1 to 8 carbon atoms, an aryl group having 6 to 10 carbon atoms, a halogen atom or a hydroxyl group at the ortho- or para-position to the hydroxyl group. For example, there can be mentioned ortho- and para-isomers of alkylphenols such as cresol, ethylphenol, n-propylphenol, isopropylphenol, n-butylphenol, sec-butylphenol, tert-butylphenol, sec-amylphenol, tert-amylphenol, hexylphenol, heptylphenol and octylphenol, halogenated phenols such as fluorophenol, chlorophenol and bromophenol, and arylphenols such as phenylphenol and tolylphenol. Furthermore, as the bifunctional phenol represented by the above general formula [I], there can be mentioned 2,3-xylenol, 3,4-xylenol, 2,5-xylenol, 2,3-diethylphenol, 3,4-diethylphenol, 2,5-diethylphenol, 2,5-diethylphenol, 2,3-diisopropylphenol, 3,4-diisopropylphenol, 2,5-diisopropylphenol, 2,3-dichlorophenol, 3,4-dichlorophenol, 2,5-dichlorophenol, 2-methyl-3-phenylphenol, 3-methyl-4-phenylphenol and 2-methyl-5-phenylphenol. The bifunctional phenol component in the novolak type recurring units (a) constituting the high-molecular-weight novolak type resin of the present invention is at least one member selected from the above-mentioned phenols, and it may be a mixture of two or more of the foregoing phenols.

The trifunctional phenol which may be contained in the novolak type recurring units (a) constituting the high-molecular-weight novolak type resin of the present invention is a phenol having on the benzene nucleus three hydrogen atoms active to the substitution reaction, and as such trifunctional phenol, there can be mentioned phenol, meta-substituted phenols and 3,5-di-substituted phenols. As substituents which such trifunctional phenol has at the meta- or 3,5-positions, there can be mentioned alkyl groups, halogen atoms and hydroxyl groups. Among these trifunctional phenols, those represented by the following general formula [III] are preferred:

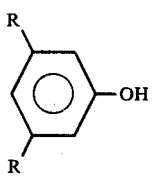

wherein R stands for a hydrogen atom, an alkyl group having 1 to 8 carbon atoms, a halogen atom or a hydroxyl group, and two R's may be the same or different.

As specific examples, there can be mentioned phenol, metasubstituted phenols such as m-cresol, m-ethylphenol, m-n-propylphenol, m-isopropylphenol, m-n-butylphenol, m-sec-butylphenol, m-tert-butylphenol, m-n-amylphenol, m-sec-amylphenol, m-tert-amylphenol, m-hexylphenol, m-heptylphenol, m-octylphenol, m-fluorophenol, m-chlorophenol, m-bromophenol and resorcinol, and 3,5-di-substituted phenols such as 3,5-xylenol, 3,5-diethylphenol, 3,5-diisopropylphenol, 3,5-di-sec-butylphenol, 3,5-di-tert-butylphenol, 3,5-di-sec-amylphenol, 3,5-di-tert-amylphenol, 3,5-dihexylphenol, 3,5-diheptylphenol, 3,5-dioctylphenol, 3,5-dichlorophenol, 3,5-difluorophenol, 3,5-dibromophenol and 3,5-diiodophenol. Among these trifunctional phenols, those represented by the above-general formula [III] in which one of the two groups R is a hydrogen atom and the other group R is selected from a hydrogen atom, an alkyl group having 1 to 8 carbon atoms and a chlorine atom are especially preferred, and phenols in which one of the two groups R is a hydrogen atom and the other group R is a hydrogen atom, a methyl group, an isopropyl group, a sec-butyl group, a tert-butyl group or an octyl group are particularly especially preferred.

The aldehyde component in the novolak type recurring units (a) constituting the high-molecular-weight novolak type resin of the present invention is an aldehyde represented by the above-mentioned general formula [II]. As such aldehyde, there can be mentioned, for example, formaldehyde, acetaldehyde, monochloroacetaldehyde, dichloroacetaldehyde and trichloroacetaldehyde. Among these aldehydes, formaldehyde and acetaldehyde, especially formaldehyde, are preferred. The aldehyde component is present in the novolak type recurring unit block (a) in the form of an alkylidene group represented by the general formula [VI].

In the present invention, the novolak type recurring units (a) consisting of the above-mentioned phenol and aldehyde components, as pointed out hereinbefore, there may be contained intervening or bridging groups (also called "chain extender component units" hereinafter) consisting of a divalent hydrocarbon group, which appear alternately in blocks of the novolak type recurring units having a number average molecular weight of 250 to 1,200. The resin of this type is characterized in that the novolak type recurring unit blocks (a) and the chain extender component units (b) are alternately arranged and connected to one another, whereby the molecular weight of the resin is increased, and that the novolak type recurring unit blocks (a) are bonded to terminals of the molecule of the resin. A simplest structure of the resin of this type comprises two molecules of the novolak type recurring unit blocks (a) connected to each other through one molecule of the chain extender component unit (b), and a simple structure next to the above-mentioned simplest structure comprises 3 molecules of the novolak type recurring unit blocks (a) and two molecules of the chain extender component units which are alternately arranged and connected to one another. Furthermore, there can be mentioned a structure comprising 4 molecules of the novolak type recurring unit blocks (a) and 3 molecules of the chain extender component units (b) which are similarly alternately arranged and connected to one another, and a structure comprising n molecules of the novolak type recurring unit blocks (a) and (n-1) molecules of the chain extender component units which are alternately arranged and connected to one another. The ratio of both the units (a) and (b) constituting the substantially linear high-molecular-weight novolak type resin of this type according to the present invention is such that the amount of the resin extender component units (b) is preferably 0.5 to 1 mole, especially preferably 0.66 to 1.0 mole, per mole of the novolak type recurring unit blocks (b).

The high-molecular-weight novolak type resin of the present invention has a polymer chain diagrammatically represented substantially by the following formula [VII]:

$(Z+Y_p\text{-}Z)_n Y_p\text{—}Z$  [VII]

wherein Z stands for a substantially linear novolak type recurring unit block formed by condensation of the above-mentioned phenol and aldehyde components, Y stands for an intervening group consisting of a divalent hydrocarbon group, p is a number of zero or 1, and n is zero or a number of at least 1.

In the high-molecular-weight novolak type resin of the above-mentioned type containing the chain extender component units, p is 1.

As the group Y, there can be mentioned hydrocarbon groups having 1 to 16 carbon atoms, such as alkylidene groups, alkylene groups, cycloalkylene groups, cycloalkylidene groups, arylalkylidene groups, arylalkylene groups and arylene-bis-alkylene groups [—R$^3$—Ar—R$^4$—]. As the alkylidene group, there can be mentioned, for example, methylene, ethylidene, propylidene and butylidene groups. As the alkylene group, there can be mentioned, for example, ethylene, propylene, isopropylene, butylene, pentylene and hexylene groups. As the cycloalkylene group, there can be mentioned, for example, cyclopentylene, cyclohexylene and methylcyclohexylene groups. As the cycloalkylidene group, there can be mentioned, for example, cyclopentylidene, cyclohexylidene and methylcyclohexylidene groups. As the arylalkylidene group, there can be mentioned, for example, benzylidene, o-xylidene, m-xylidene and p-xylidene groups. As the arylalkylene group, there can be mentioned, for example, styrene, α-methylstyrene and p-methylstyrene groups. As the arylene-bis-alkylene group, there can be mentioned, for example, o-xylylene, m-xylylene and p-xylylene groups. Among these chain extender component units (b), alkylidene, alkylene, cycloalkylidene, cycloalkylene, arylalkylidene, arylalkylene and arylene-bis-alkylene groups are preferred, and alkylidene groups having 1 to 4 carbon atoms, alkylene groups having 2 to 5 carbon atoms, arylalkylidene groups having 7 to 9 carbon atoms, arylalkylene groups having 8 to 10 carbon atoms and arylene-bis-alkylene groups having 8 to 10 carbon atoms are especially preferred.

When the molecular weight of these chain extender component units (b) is too high, the melting point of the resulting high-molecular-weight novolak type substituted phenolic resin is reduced but the flexibility is increased. Therefore, even if such resin is incorporated in a setting type resin, there can hardly be obtained a setting resin composition excellent in the heat resistance and mechanical properties. Accordingly, it is preferred that the molecular weight of the chain extender component unit (b) be 14 to 200 and especially 14 to 170.

The structure of the substantially linear high-molecular-weight novolak type resin of the present invention may be determined according to the following methods.

In the high-molecular-weight novolak type resin, the content of the bifunctional phenol and trifunctional phenol is determined by $^1$H nuclear magnetic resonance spectrum, $^{13}$C nuclear magnetic resonance spectrum and pyrolysis gas chromatography. More specifically, in $^1$H nuclear magnetic resonance spectrum and $^{13}$C nuclear magnetic resonance spectrum, the content of the total phenol component can be obtained from the intensity of the signal based on the hydrogen atom of the phenolic hydroxyl group of the phenol component in the resin, and the ratio of the binfunctional and trifunctional phenols can be determined from the relation of the intensity of the signal based on the hydrogen atom of the phenolic hydroxyl group to the intensities of the signals of the hydrogen atoms bonded to the benzene nucleus at the ortho-, meta- and para-positions to said phenolic hydroxyl group. Furthermore, the contents of the total phenol component and the aldehyde component in the resin are determined from $^1$H nuclear magnetic resonance spectrum. The ratio of the bifunctional and trifunctional phenols constituting the resin can also be determined from the results of pyrolysis gas chromatography. More specifically, the ratio of the bifunctional and trifunctional phenols is calculated based on the results of determination of phenols formed by pyrolysis. Furthermore, the ratio of the methylol group and methylene group contained in the resin can be determined from the results of the $^1$H nuclear magnetic resonance analysis. The number average molecular weight ($\overline{M}n$) of the high-molecular-weight novolak type resin of the present invention is one measured according to the vapor pressure osmometry in N,N-dimethylacetamide as the solvent, and the molecular weight distribution ($\overline{M}w/\overline{M}n$) expresed as the ratio of the weight average molecular weight ($\overline{M}w$) to the number average molecular weight ($\overline{M}n$) in the resin of the present invention is determined by gel permeation chromatography using tetrahydrofuran as the solvent. The molecular weight distribution expressed as the content of the resin components having a number average molecular weight ($\overline{M}n$) of at least 2,000 is determined from a distribution curve of the number average molecular weights determined according to the above-mentioned method. The melting point of the high-molecular-weight novolak type resin is measured by the microscopic method. That is, the temperature at which melt flow is initiated is defined as the melting point.

As pointed out hereinbefore, a substantially linear high-molecular-weight novolak type resin can hardly be obtained according to the process comprising directly condensing a phenol with an aldehyde in the presence of an acid catalyst.

In contrast, according to the present invention, a substantially linear high-molecular-weight novolak type resin can be obtained by condensing a substantially linear novolak type substituted phenolic resin (a'), which has a relatively low molecular weight and is derived from a phenol comprised mainly of a bifunctional phenol such as mentioned above and an aldehyde, with a chain extender (b') in the presence of an acid catalyst. Furthermore, according to the present invention, a substantially linear high-molecular-weight novolak type resin can be obtained by chain-extending a phenol comprised mainly of a bifunctional phenol with a resol type phenolic resin.

The process for the preparation of substantially linear high-molecular-weight novolak type resins according to the present invention include the following 4 embodiments.

EMBODIMENT I

According to one preferred embodiment of the present invention, a low-molecular-weight novolak type substituted phenolic resin (c) is reacted with a dimethylolated phenol (d) as a chain extender in the presence of an acid catalyst. In this embodiment, the dimethylolated phenol (d) as the chain extender cannot be distinguished from the novolak type recurring unit after it has been included in the molecular chain. Accordingly, in the general formula [VII] representing the product resin, p is zero.

The low-molecular-weight novolak type substituted phenolic resin (c) used as the starting substance in this process I is characterized by the following 3 points.

(A) The phenol component is comprised mainly of at least one bifunctional phenol and is especially a phenol component comprising 70 to 100 mole %, preferably 80 to 100 mole %, especially preferably 90 to 100 mole %, of a bifunctional phenol and up to 30 mole %, preferably up to 20 mole %, especially preferably up to 10 mole %, of a trifunctional phenol (the total amount of both the phenols being 100 mole %).

(B) The aldehyde component is at least one aldehyde represented by the above-mentioned general formula [II].

(C) The number average molecular weight is 250 to 1,200, preferably 350 to 1,000 and especially preferably 400 to 800, as measured according to the vapor pressure osmometry in N,N-dimethylacetamide as the solvent.

The structure of this starting novolak type substituted phenolic resin (c) will now be described.

The bifunctional phenol of the phenol component constituting this novolak type substituted phenolic resin is present in the form of hydroxyarylene units represented by the above-mentioned general formula [IV] in the resin molecule and in the form of hydroxyaryl units represented by the above-mentioned general formula [V] at terminals of the rein molecule. Also the trifunctional phenol is similarly present in the form of hydroxylarylene units of the general formula [IV] in the resin molecule and in the form of hydroxyaryl units of the general formula [V] at terminals of the resin molecule. The aldehyde of the above-mentioned general formula [II] constituting this starting novolak type substituted phenolic resin is present in the form of methylene units represented by the above-mentioned general formula [VI]. This starting novolak type substituted phenolic resin has a chain structure in which the above-mentioned hydroxyarylene and methylene units are alternately arranged. More specifically, in the case where the phenol component is comprised solely of a bifunctional phenol represented by the above general formula [II], the novolak type substituted phenolic resin is linear, and if the content of the trifunctional phenol is increased, the phenolic resin sometimes has a branched chain structure. The ratio of the aldehyde component to the total phenol component in this starting novolak type substituted phenolic resin is such that the amount of the aldehyde component is 0.95 to 1.0 mole, preferably 0.97 to 1.0 mole, per mole of the total phenol component. Ordinarily, this starting novolak type substituted phenolic resin is free of a methylol group or a substituted methylol group, but the substituted phenolic resin may contain a methylol or substituted methylol group in a minute amount of up to 0.01 mole per mole of the total phenol component. The melting point of this starting novolak type substituted phenolic resin is ordinarily 50 to 120° C. and preferably 60° to 90° C. As the bifunctional phenol, trifunctional phenol and aldehyde constituting this starting novolak type substituted phenolic resin, those mentioned hereinbefore can be used.

This starting novolak type substituted phenolic resin (c) can easily be obtained by polycondensing the above-mentioned phenol and aldehyde in the presence of an acid catalyst according to known procedures.

In this starting novolak type substituted phenolic resin, it is indispensable that the content of the trifunctional phenol in the total phenol component should be up to 30 mole %. If this content exceeds 30 mole %, when a high-molecular-weight novolak type resin is prepared by the chain-extending reaction, crosslinking reaction is caused and the resin is gelled, with the result that an intended high-molecular-weight resin having a chain structure cannot be obtained. In order to obtain a high-molecular-weight resin having a chain structure, especially a linear high-molecular-weight resin, it is preferred that the content of the trifunctional phenol in the phenol component of the starting novolak type substituted phenolic resin be low.

The dimethylolated phenol (d) used as the other starting substance is a dimethylolation product of the above-mentioned bifunctional phenol and/or the above-mentioned trifunctional phenol. More specifically, the dimethylolated phenol (d) is a dimethylolated phenol represented by the following general formula [VIII]:

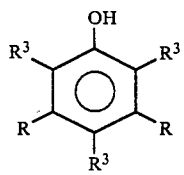

[VIII]

wherein two of three groups $R^3$ are groups

the remaining one group $R^3$ is a hydrogen atom, an alkyl group having 1 to 8 carbon atoms, an aryl group having 6 to 10 carbon atoms, a halogen atom or a hydroxyl group, $R^2$ stands for a hydrogen atom, a methyl group or a halogenated methyl group, and R stands for a hydrogen atom, an alkyl group having 1 to 8 carbon atoms, a halogen atom or a hydroxyl group. A mixture of two or more of dimethylolated phenols of the general formula [VIII] may also be used as the dimethylolated phenol (d). When one dimethylolated phenol is used, it is preferred that the dimethylolated phenol (d) be a dimethylolation product of a bifunctional phenol represented by the above-mentioned general formula [I]. When a mixture of two or more of dimethylolated phenols of the above general formula [VIII] is used as the dimethylolated phenol (d), it is preferred that the content of a dimethylolation product of a bifunctional phenol of the general formula [I] in the mixture be at least 80 mole % and the content of a dimethylolation product of a trifunctional phenol of the above general formula [III] in the mixture be up to 20 mole %. It is especially preferred to use a mixture comprising at least 90 mole % of a dimethylolation product of a bifunctional phenol of the general formula [I] and up to 10 mole % of a dimethylolation product of a trifunctional phenol of the general formula [III]. As the mixture of at least two dimethylolated phenols, there can be mentioned, for example, dimethylolation products of mixtures of ortho-, meta- and para-isomers of alkylphenols and halogenated phenols. As the dimethylolated phenol represented by the above general formula [VIII], there can be mentioned, for example, dihydroxymethylphenols, such as 2,6-dihydroxymethylphenol and 2,4-dihydroxymethylphenol; dihydroxymethylcresols such as 4,6-dihydroxymethyl-2-cresol, 2,6-dihydroxymethyl-3-cresol, 4,6-dihydroxymethyl-3-cresol, 2,6-dihydroxymethyl-4-cresol and mixtures of two or more of these dihydroxymethylcresols; dihydroxymethyl-n-propylphenols such as 4,6-dihydroxymethyl-3-n-propylphenol, 2,6-dihydroxymethyl-3-n-propylphenol, 4,6-dihydroxymethyl-3-n-propylphenol, 2,6-dihydroxymethyl-4-n-propylphenol and mixtures of two or more of these dihydroxymethyl-n-propylphenols; dihydroxymethylisopropylphenols such as 4,6-dihydroxymethyl-2-isopropylphenol, 2,6-dihydroxymethyl-3-isopropylphenol, 4,6-dihydroxymethyl-3-isopropylphenol, 2,6-dihydroxymethyl-4-isopropylphenol and mixtures of two or more of these dihydroxymethylisopropylphenols, similar dihydroxymethylation products of n-butylphenol, sec-butyphenol, tert-butylphenol, n-amylphenol, sec-amylphenol, tert-amylphenol, hexylphenol, heptylphenol, octylphenol, fluorophenol, chlorophenol, bromophenol and iodophenol; bis(methylhydroxymethyl)phenols such as 2,6-bis(1-methyl-1-hydroxymethyl)phenol and 2,4-bis(1-methyl-1-hydroxymethyl)phenol; bis(methylhydroxymethyl)cresols such as 4,6-bis(1-methyl-1-hydroxymethyl)-2-cresol, 2,6-bis(1-methyl-1-hydroxymethyl)-3-cresol, 4,6-bis(1-methyl-1-hydroxymethyl)-3-cresol, 2,6-bis(1-methyl-1-hydroxymethyl)-4-cresol and mixtures of two or more of these bis(methylhydroxymethyl)cresol; similar bis(methylhydroxymethyl) compounds of n-propylphenol, isopropylphenol, n-butylphenol, sec-butylphenol, tert-butylphenol, n-amylphenol, sec-amylphenol, tert-amylphenol, hexylphenol, heptylphenol, octylphenol, fluorophenol, chlorophenol, bromophenol and iodophenol; and bis(chloromethylhydroxymethyl) compounds, bis(dichloromethylhydroxymethyl) compounds, bis(trichloromethylhydroxymethyl) compounds, bis(bromomethylhydroxymethyl) compounds, bis(dibromomethylhydroxymethyl) compounds and bis(tribromomethylhydroxymethyl) compounds of similar phenols.

Among dimethylolated phenols (d) represented by the above general formula [VIII], there are preferably used those in which two of three groups $R^3$ in the general formula [VIII] stand for a methylol group represented by the formula

the remaining one group $R^3$ is a substituent selected from the group consisting of a methyl group, an ethyl group, an isopropyl group, a sec-butyl group, a tert-butyl group, an octyl group and a chlorine atom, one of two groups R is a hydrogen atom, the remaining one group R is a hydrogen atom or an alkyl group having 1 to 8 carbon atoms and $R^2$ stands for a hydrogen atom or a methyl group. Dimethylolated phenols of the general formula [VIII], in which two of three groups $R^3$ stand for a methylol group represented by the formula

the remaining one group $R^3$ is a methyl, ethyl, isopropyl, sec-butyl or tert-butyl group, each of two groups R stands for a hydrogen atom and $R^2$ is a hydrogen atom or methyl group, are especially preferred. A dimethylolation product of o-cresol and/or p-cresol is particularly especially preferred as the dimethylolated phenol (d).

Any of acid catalysts customarily used for the production of novolak type phenolic resins can be used in the present invention. More specifically, as the acid catalyst that can be used in the present invention, there can be mentioned, for example, protonic acids such as nitric acid, sulfuric acid, hydrochloric acid, perchloric acid, phosphoric acid, toluene-sulfonic acid and methane-sulfonic acid, boron trifluoride, boron trifluoride complexes such as boron-trifluoride-ether complex, and Lewis acids such as aluminum trichloride, tin tetrachloride, zinc chloride, ferric chloride and titanium tetrachloride. Among these acid catalysts, there are preferably used protonic acid, boron trifluoride, boron trifluoride complexes and aluminum trichloride, and the use of nitric acid, sulfuric acid, boron trifluoride or boron trifluoride complex is especially preferred. The acid catalyst is used in an amount of 0.01 to 10 parts by weight, preferably 0.1 to 5 parts by weight, per 100 parts by weight of the starting novolak type substituted phenolic resin. When the starting novolak type substituted phenolic resin contains an acid catalyst added at the step of forming this phenolic resin, since this catalyst exerts a catalytic activity, a fresh acid catalyst need not be particularly added for the polycondensation.

In this polycondensation reaction, the ratio between the starting novolak type substituted phenolic resin (c) and the dimethylolated phenol (d) is changed according to the desirable number average molecular weight of the resulting high-molecular weight novolak type resin. As the molar ratio of the dimethylolated phenol (d) to the starting novolak type substituted phenolic resin (c) is close to 1, a high-molecular-weight novolak type resin having a higher number average molecular weight is obtained. The mixing ratio between the starting novolak type substituted phenolic resin (c) and the dimethylolated phenol (d) is such that the amount of the methylol groups in the dimethylolated phenol (d) is 0.5 to 1.5 equivalents, preferably 0.8 to 1.2 equivalents, especially preferably 0.9 to 1.1 equivalents, per equivalent of the hydroxyaryl units of the general formula [I] present at terminals of the molecule of the starting novolak type substituted phenolic resin (c).

The polycondensation reaction is easily advanced by heating and stirring the starting novolak type substituted phenolic resin (c) and the dimethylolated phenol (d) represented by the above general formula [VIII] in the presence of an acid catalyst while removing water formed by the reaction from the reaction system. The polycondensation reaction may be carried out either in the absence of a solvent or in the presence of a solvent. When the polycondensation reaction is carried out in the absence of a solvent, the starting mixture is heated at a temperature higher than the melting temperature and the molten mixture is stirred to effect the reaction, while water formed by the reaction is removed by distillation under atmospheric pressure or reduced pressure. As the solvent that is used when the polycondensation reaction is carried out in the presence of a solvent, there can be mentioned, for example, toluene, o-dichlorobenzene, diphenyl ether and decalin. The solvent is used in an amount of 50 to 300 parts by weight, preferably 100 to 200 parts by weight, per 100 parts by weight of the starting novolak type substituted phenolic resin.

The polycondensation temperature is ordinarily in the range of from 100° to 250° C. and preferably in the range of 150° to 200° C. The time required for the polycondensation reaction is changed according to the reaction temperature and other conditions, and the reaction time is not particularly critical but optional. However, the reaction time is ordinarily in the range of from 1 to 10 hours and preferably in the range of from 2 to 5 hours. After the polycondensation reaction, the reaction mixture is thrown into a poor solvent such as methanol, acetone or water to precipitate the high-molecular-weight novolak type resin, or the solvent is removed from the reaction mixture by distillation under heating to recover the high-molecular-weight novolak type resin.

According to this embodiment, the reaction of both the starting substances is easily advanced and a high-molecular-weight novolak type resin is formed most readily. Therefore, the process of this embodiment is most suitable for attaining the objects of the present invention.

EMBODIMENT II

According to another preferred embodiment of the present invention, a low-molecular-weight novolak type substituted phenolic resin (c) is reacted with a low-molecular-weight resol type substituted phenolic resin (e) as a chain extender in the presence of an acid catalyst. Also in this embodiment, the resol type substituted phenolic resin (e) cannot be distinguished from the novolak type recurring units when the resol type substituted phenolic resin (e) is included in the polymer chain of the resulting high-molecular-weight novolak type resin. Accordingly, in the general formula [VII] representing the product resin, p is zero.

The same low-molecular-weight novolak type substituted phenolic resins (d) as described hereinbefore with reference to the embodiment I are used as the resin (d) in this embodiment.

The resol type substituted phenolic resin (e) that is used as the other starting substance is a resol type substituted phenolic resin characterized by the following three points.

(A) The phenol component constituting the resol type substituted phenolic resin (e) is a phenol component comprised mainly of at least one bifunctional phenol represented by the above-mentioned general formula [I], especially a phenol comprising 70 to 100 mole %, preferably 80 to 100 mole %, especially preferably 90 to 100 %, of at least one bifunctional phenol of the general formula [I] and up to 30 mole %, preferably up to 20 mole %, especially preferably up to 10 mole %, of a trifunctional phenol (the total amount of both the phenols being 100 mole %).

(B) The aldehyde component comprises at least one aldehyde represented by the above-mentioned general formula [II].

(C) The number average molecular weight of the resol type substituted phenolic resin (e) is 250 to 1,200, preferably 350 to 1,000, especially preferably 400 to 800, as measured according to the vapor pressure osmometry in N,N-dimethylacetamide as the solvent.

The structure of this starting resol type substituted phenolic resin (e) will now be described.

The bifunctional phenol constituting this resol type substituted phenolic resin is present in the form of hydroxyarylene units represented by the above-mentioned general formula [IV] in the resin molecule and is present in the form of substituted hydroxymethylaryl units represented by the following general formula [IX]:

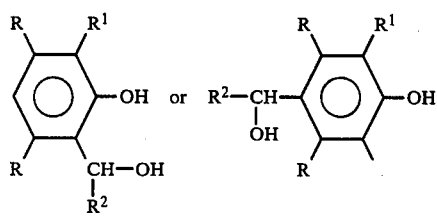

wherein $R^1$, $R^2$ and R are as defined above, at terminals of the resin molecule. Furthermore, the trifunctional group is similarly present in the form of hydroxyarylene units as represented by the general formula [IV] in the resin molecule and is present in the form of methylol group-containing hydroxyarylene units as represented by the general formula [IX] at terminals of the resin molecule [incidentally, in case of the trifunctional group, $R^1$ in the general formulae [IV] and [IX] stands for a hydrogen atom]. The aldehyde of the above general formula [II] constituting the starting resol type substituted phenolic resin is present in the form of methylene units represented by the above-mentioned general formula [VI] in the resin molecule and is present in the form of methylol group units represented by the following general formula [X]:

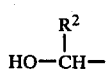   [X]

wherein $R^2$ stands for a hydrogen atom or a substituted selected from the group consisting of methyl and halogenated methyl groups, at terminals of the resin molecule. This starting resol type substituted phenolic resin (e) has a chain structure in which the above-mentioned hydroxyarylene units and methylene units are alternately arranged. More specifically, when the phenol component is comprised solely of a bifunctional phenol represented by the above general formula [I], the resol type substituted phenolic resin (e) has a linear chain structure, and if the content of the trifunctional group is increased, the resol type substituted phenolic resin (e) has sometimes a branched chain structure. The ratio of the aldehyde component to the total phenol component in the resol type substituted phenolic resin (e) is such that the amount of the aldehyde is 0.90 to 1.0 mole, preferably 0.93 to 1.0 mole, per mole of the total phenol component. The melting point of this starting resol type substituted phenolic resin is ordinarily higher than 120° C. and preferably higher than 150° C. As the bifunctional phenol, trifunctional phenol and aldehyde constituting the starting resol type substituted phenolic resin, there can be used those described hereinbefore.

This starting resol type substituted phenolic resin (e) can easily be obtained by polycondensing the above-mentioned phenol component with the above-mentioned aldehyde. It is indispensable that the content of the trifunctional phenol in the total phenol component contained in the starting resol type substituted phenolic resin should be up to 30 mole %. If this content exceeds 30 mole %, crosslinking reaction is caused in the resin at the polycondensation step and the resin is gelled, and therefore, a high-molecular-weight resin having a chain structure cannot be obtained. In order to obtain a high-molecular weight novolak type substituted phenolic resin having a chain structure, especially a linear chain structure, it is preferred that the content of the trifunctional phenol in the total phenol component of the starting resol type substituted phenolic resin be low.

The ratio between the starting novolak type substituted phenolic resin (c) and resol type substituted phenolic resin (e) used for the polycondensation reaction is changed according to the intended number average molecular weight of the resulting high-molecularweight novolak type resin. As the molar ratio of the starting resol type substituted phenolic resin (e) to the starting novolak type substituted phenolic resin (c) is close to 1, a high-molecular-weight novolak type substituted phenolic resin having a higher number average molecular weight is obtained. The ratio between the starting novolak type substituted phenolic resin (c) and resol type substituted phenolic resin (e) is such that the amount of the methylol groups of the resol type substituted phenolic resin (e) is 0.5 to 1.5 equivalents, preferably 0.8 to 1.2 equivalents, especially preferably 0.9 to 1.1 equivalents, per equivalent of the hydroxyaryl units of the above general formula [V] which are present at terminals of the molecule of the starting novolak type substituted phenolic resin (c).

The polycondensation reaction can easily be advanced by heating and stirring the starting novolak type substituted phenolic resin (c) and resol type substituted phenolic resin (e) in the presence of an acid catalyst to effect the reaction while removing water formed by the reaction from the reaction system.

Any of acid catalysts mentioned hereinbefore with reference to the embodiment I can be used also in this embodiment in the amount described hereinbefore with reference to the embodiment I. Other reaction conditions may be the same as those described hereinbefore with reference to the embodiment I.

Although both the resol type substituted phenolic resin and the novolak type substituted phenolic resin are independently prepared in this embodiment, the process of this embodiment is advantageous in that a substantially linear high-molecular-weight novolak resin can be prepared in a high yield.

EMBODIMENT III

In accordance with still another embodiment of the present invention, a low-molecular-weight novolak type substituted phenolic resin (c) is reacted and polycondensed with a chain extender (f) selected from an aldehyde, a ketone, a diol and a dihalide in the presence of an acid catalyst. In this embodiment, divalent hydrocarbon groups derived from the chain extender are included in the polymer chain in such a manner that novolak type recurring unit blocks are connected with one another through these divalent hydrocarbon groups as intervening groups. Accordingly, p in the above-mentioned general formula [VII] representing the resulting high-molecular-weight novolak type resin is 1.

As the starting low-molecular-weight novolak type substituted phenolic resin (c), there may similarly be used those mentioned hereinbefore with reference to the embodiment I.

As the chain extender (f), there are used aldehydes, ketones, diols or dihalides capable of introducing in the phenol ring a divalent hydrocarbon group Y in the general formula [VII], especially an alkylidene group, an alkylene group, a cycloalkylene group, a cycloalkylidene group, an arylalkylidene group, an arylalkylene group or an arylene-bis-alkylene group, by the reaction with the novolak type substituted phenolic resin (c).

Appropriate aldehydes and ketones are represented by the following general formula [XI]:

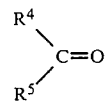

wherein $R^4$ stands for a hydrogen atom or an alkyl group having 1 to 8 carbon atoms, $R^5$ stands for a hydrogen atom, an alkyl group having 1 to 8 carbon atoms or an aryl group having 6 to 10 carbon atoms, and $R^4$ and $R^5$ are bonded together through an intervening carbonyl carbon atom to form a cycloalkane. Appropriate diols and dihalides are represented by the following general formula [XII]:

X—Y—X           [XII]

wherein Y is as defined above and X stands for a hydroxyl group or a halogen atom.

As specific examples of the chain extender (f), there can be mentioned aliphatic aldehydes of the general formula [II] exemplified hereinbefore; aliphatic aldehydes such as formaldehyde, (formalin), acetaldehyde, propionaldehyde, butylaldehyde, isobutylaldehyde, valeraldehyde, isovaleraldehyde; aliphatic ketones such as acetone, methylethylketone, diethylketone, methylisopropylketone, methylisobutylketone; alkylene glycols such as ethylene glycol, propylene glycol, butylene glycol, pentylene glycol and hexylene glycol; alkylene dihalides such as ethylene fluoride, ethylene chloride, ethylene bromide, ethylene iodide, propylene fluoride, propylene chloride, propylene bromide, butylene chloride, butylene bromide, pentylene chloride, pentylene bromide, hexylene chloride and hexylene bromide; cycloalkyl aldehydes such as cyclohexylaldehyde; cycloalkylene glycols such as cyclopentylene glycol, cyclohexylene glycol and methylcyclohexylene glycol; cycloalkylene dihalides such as cyclopentylene chloride, cyclohexylene chloride and methylcyclohexylene chloride; alicyclic ketones such as cyclopentanone and cyclohexanone; cycloalkylidene dihalides such as cyclohexylidene dichloride; aromatic aldehydes such as benzaldehyde and tolualdehyde; aromatic ketones such as acetophenone, methyltolyl ketone, ethylphenyl ketone, propylphenylketone and benzophenone; arylalkylidene diols such as benzylidene diol and xylidene diol; arylalkylidene dihalides such as benzylidene fluoride, benzylidene chloride, benzylidene bromide, xylidene chloride and xylidene bromide; arylalkylene glycols such as styrene glycol, α-methylstyrene glycol and p-methylstyrene glycol; arylalkylene dihalides such as styrene dibromide, styrene dichloride, styrene dibromide, α-methylstyrene dichloride, α-methylstyrene dibromide and p-methylstyrene dichloride; xylylene glycols such as o-xylylene glycol, m-xylylene glycol and p-xylylene glycol; arylene-bis-alkylene glycols such as o-bis(1-hydroxyethyl)benzene, m-bis(1-hydroxyethyl)benzene and p-bis(1-hydroxyethyl)benzene; and arylene-bis-alkylene dihalides such as o-xylylene chloride, m-xylylene chloride, p-xylylene chloride, o-xylylene bromide, m-xylylene bromide, p-xylylene bromide, o- bis(1-chloroethyl)benzene, m-bis(1-chloroethyl)benzene and p-bis(1-chloroethyl)benzene.

As the molar ratio of the chain extender (f) to the starting novolak type substituted phenolic resin (c) is close to 1, a high-molecular-weight novolak type resin having a higher number average molecular weight is obtained. The ratio between the starting novolak type substituted phenolic resin (c) and chain extender (f) used for the polycondensation reaction is such that the amount of the reactive functional group of the chain extender (f) is 0.5 to 1.5 equivalents, preferably 0.8 to 1.2 equivalents, especially preferably 0.9 to 1.1 equivalents, per equivalent of the hydroxyaryl units of the general formula [V] which are present at terminals of the molecule of the starting novolak type substituted phenolic resin (c).

The polycondensation reaction is easily advanced by heating and stirring the starting novolak type substituted phenolic resin (c) and chain extender (f) in the presence of an acid catalyst while removing water formed by the reaction from the reaction system.

As the acid catalyst, those mentioned hereinbefore with reference to the embodiment I are used in amounts described hereinbefore with reference to the embodiment I. Other reaction conditions may be the same as those described hereinbefore with reference to the embodiment I.

According to this embodiment, units of the chain extender (f), which are different from the novolak recurring units, are included in the novolak recurring units. However, the process of this embodiment is suitable for attaining the object of obtaining a high-molecular-weight novolak resin having a higher number average molecular weight. Furthermore, when an aldehyde or dihalide is used as the chain extender, the process of this embodiment is especially advantageous in that the polycondensation reaction can be accomplished very easily.

EMBODIMENT IV

In accordance with still another embodiment of the present invention, a phenol (g) comprised mainly of a bifunctional phenol is reacted with a low-molecular-weight resol type substituted phenolic resin (e) in the presence of an acid catalyst to effect polycondensation. In this embodiment, as in the above-mentioned embodiment II, the resol type substituted phenolic resin (e) cannot be distinguished from the novolak type recurring units when it is included in the molecule chain. Accordingly, in the general formula [VII] representing the resulting high-molecular-weight novolak resin, p is zero.

The starting phenol (g) comprises 70 to 100 mole %, preferably 80 to 100 mole %, especially preferably 90 to 100 mole %, of at least one bifunctional phenol represented by the above general formula [I] and up to 30 mole %, preferably up to 20 mole %, especially preferably up to 10 mole %, of a trifunctional phenol represented by the above general formula [III]. As the bifunctional phenol and trifunctional phenol, those exemplified hereinbefore may be used.

The resol type substituted phenolic resin (e) described hereinbefore with reference to the embodiment II can similarly be used also in this embodiment.

The ratio between the starting phenol (g) and resol type substituted phenolic resin (e) used for the polycondensation reaction is changed according to the intended number average molecular weight of the resulting high-molecular-weight novolak type resin. As the molar ratio of the starting resol type substituted phenolic resin (e) to the starting phenol (g) is close to 1, a high-molecular-weight novolak resin having a higher number average molecular weight is obtained. The ratio between the starting phenol (g) and resol type substituted phenolic resin (e) used for the polycondensation reaction is such that the amount of the methylol group of the resol type substituted phenolic resin (e) is 1 to 3 equivalents, preferably 1.6 to 2.4 equivalents, especially preferably 1.8 to 2.2 equivalents, per mole of the starting phenol (g).

The polycondensation reaction can easily be advanced by heating and stirring the starting phenol (g) and resol type substituted phenolic resin (e) in the presence of an acid catalyst while removing water formed by the reaction from the reaction system.

Acid catalysts described hereinbefore with reference to the embodiment I may similarly be used in the same amounts as described hereinbefore with reference to the embodiment I except that the amounts are determined based on the resol type substituted phenolic resin. Other reaction conditions are the same as those described hereinbefore with reference to the embodiment I.

When the substantially linear high-molecular-weight novolak type resin of the present invention is incorporated in setting type resins such as epoxy resins, urethane resins, melamine resins, polybismaleimide resins, alkyd resins, unsaturated polyesters, novolak type phenolic resins and resol type phenolic resins, there can be obtained setting type resin compositions having highly improved heat and mechanical properties. Furthermore, the substantially linear high-molecular-weight novolak type resin of the present invention can be used for a viscosity increaser for a rubber, a tackifier for an adhesive and for a printing ink, a paint and an ink for a pressure-sensitive copying paper.

The present invention will now be described in detail with reference to the following Examples that by no means limit the scope of the invention.

REFERENTIAL EXAMPLE 1

A reaction vessel was charged with 108 g (1 mole) of p-cresol, 77 g (0.95 mole as HCHO) of 37% formalin and 0.1 ml of 35% hydrochloric acid, and reaction was carried out for 1 hour at 90° C. and for another 1 hour 1 at 120° C. under reflux. Then, dehydration and concentration were conducted under a reduced pressure of 100 mmHg and when the temperature of the reaction mixture was 150° C., the reaction mixture was taken out from the reaction vessel, cooled and solidified to obtain 108 g of a resin.

The number average molecular weight $\bar{M}n$ of this resin was 510 as measured according to the vapor pressure osmometry in dimethylacetamide at 90° C., and the ratio of $\bar{M}w/\bar{M}n$ determined from the results of gel permeation chromatography was 1.4. The melting point of the resin was 83° C. as measured according to the microscopic method.

ran and the like, it was confirmed that a three-dimensional crosslinked structure (gelled portion) is not formed.

TABLE 2

| Referential Example No. | Phenol Derivative | Amount (g) | Amount (g) of Formed Resin and Yield (%) | Properties of Formed Resin | | |
|---|---|---|---|---|---|---|
| | | | | $\overline{Mn}$ | $\overline{Mw}/\overline{Mn}$ | Melting Point (°C.) |
| 2 | o-cresol | 108 | 110 (92) | 550 | 1.53 | 60–68 |
| 3 | p-t-butylphenol | 150 | 153 (95) | 450 | 1.41 | 62–70 |
| 4 | p-chlorophenol | 129 | 123 (93) | 430 | 1.38 | 70–81 |

The resin was dissolved in pyridine-d$_5$ and the $^1$H nuclear magnetic resonance spectrum was determined to obtain results shown in Table 1.

TABLE 1

| τ Value | Attribution | Intensity Ratio |
|---|---|---|
| 7.9 | —CH$_3$ | 10.0 |
| 6.15 | —CH$_2$— | 4.8 |
| 5.3 | —CH$_2$OH | 0.01 |
| 3.1–3.2<br>3.0 | 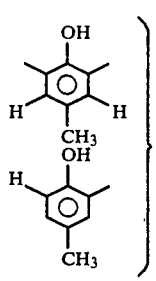 | 7.7 |
| 1.75 | 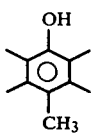 | 2.5 |

From the foregoing results, it was confirmed that the novolak type p-cresol/formaldehyde resin obtained according to the above-mentioned method hardly contains a methylol group at the molecule terminal and was a linear structure in which p-cresol units and methylene units are alternately arranged. Furthermore, since this novolak type p-cresol/formaldehyde resin was completely dissolved in dimethylacetamide, pyridine, tetrahydrofuran and the like, it was confirmed that no three-dimensional crosslinked structure (gelled portion) is formed.

REFERENTIAL EXAMPLES 2 THROUGH 4

Procedures of Referential Example 1 were repeated in the same manner except that o-cresol, p-tert-butylphenol were used in amounts indicated in Table 2 instead of p-cresol. The number average molecular weight ($\overline{Mn}$) and structure of each of the so obtained resins were determined according to the methods described in Referential Example 1. It was confirmed that each of these resins is a novolak type substituted phenol/formaldehyde resin having a linear structure in which the phenol units and methylene units are alternately arranged, as in the product of Referential Example 1. Furthermore, since these resins were completely dissolved in dimethylacetamide, pyridine, tetrahydrofuran and the like, it was confirmed that a three-dimensional crosslinked structure (gelled portion) is not formed.

REFERENTIAL EXAMPLES 5 THROUGH 7 p-Cresol was mixed with m-cresol as shown in Table 4, and the mixture, 77 g (0.95 mole as HCHO) of 37% formalin and 0.1 ml of 35% hydrochloric acid were charged in a reaction vessel. Reaction was carried out for 1 hour at 90° C. and for another 1 hour at 120° C. under reflux. Dehydration and concentration were then conducted under a reduced pressure of 100 mmHg, and when the temperature of the reaction product was 150° C., the reaction product was taken out from the reaction vessel, cooled and solidified to obtain 108 g. of a resin.

The number average molecular weight ($\overline{Mn}$), molecular weight distribution and melting point of the obtained resin were determined according to the vapor pressure osmometry (at 90° C. in dimethylacetamide), gel permeation chromatography and microscopic method, respectively. The ratio between the p-cresol and m-cresol units constituting the resin was determined from data of $^1$H nuclear magnetic resonance spectrum determined in pyridine-d$_5$. The obtained results are shown in Table 3.

The structures of the obtained resins were examined in the same manner as described in Referential Example 1. It was found that the resins obtained in Referential Examples 5 and 6 contain both the p-phenol and m-phenol units as the phenol units and they are novolak type substituted phenol/formaldehyde resins having a linear structure in which these phenol units and methylene units are alternately arranged and parts of the m-phenol units are branched. Since these resins were completely dissolved in dimethylacetamide, it was confirmed that these resins do not contain a three-dimensional crosslinked structure (gelled portion). The resin obtained in Referential Example 7 was found to have a structure in which the p-phenol and m-phenol units are contained as the phenol units, and these phenol units and the methylene units are alternately arranged. However, since the resin contained a portion insoluble in dimethylacetamide, it was confirmed that a gelled portion, that is, a three-dimensional crosslinked structure, is partially contained in the resin. Properties of these novolak type substituted phenol/formaldehyde resins are shown in Table 3.

TABLE 3

| | | Intensity Ratio | |
|---|---|---|---|
| τ Value | Attribution | Referential Example 5 | Referential Example 6 |
| 7.9 | —CH$_3$ | 10.0 | 10.0 |

TABLE 3-continued

| τ Value | Attribution | Intensity Ratio | |
|---|---|---|---|
| | | Referential Example 5 | Referential Example 6 |
| 6.1–6.3 | —CH$_2$— | 4.8 | 4.8 |
| 3.3–3.4 | (OH-cresol with H and CH$_3$, two rings) | 0.9 | 0.9 |
| 3.1–3.2 | (OH ring with H, H, CH$_3$) | 6.8 | 5.9 |
| 3.0 | (OH ring with H, CH$_3$) | | |
| 1.75 | (OH ring with CH$_3$) | 2.5 | 2.5 |

TABLE 4

| Referential Example No. | Starting Phenols | | Amount (g) of Formed Resin | Phenol Composition (mole %) | | Properties of Formed Resins | | | |
|---|---|---|---|---|---|---|---|---|---|
| | p-cresol | m-cresol | | p-cresol | m-cresol | $\overline{Mn}$ | $\overline{Mw}/\overline{Mn}$ | Melting Point (°C.) | Structure |
| 5 | 97.2 g (0.9mole) | 10.8 g (0.1mole) | 109 | 88 | 12 | 380 | 2.1 | 60–70 | linear structure including branches |
| 6 | 86.4 g (0.8mole) | 21.6 g (0.2mole) | 109 | 76 | 24 | 550 | 18.9 | 100–125 | linear structure including branches |
| 7 | 54.0 g (0.5mole) | 54.0 g (0.5mole) | 115 | measurement was impossible because of gelation | | measurement was impossible because of gelation | | | partially crosslinked | value of 5.3 was not observed. Accordingly, it was confirmed that the obtained resin is a novolak type p-cresol/formaldehyde resin having a linear structure in which the p-cresol units and the methylene units are alternately arranged. Since the resin was completely dissolved in dimethylacetamide, it was confirmed that a three-dimensional crosslinked structure (gelled portion) is not present.

TABLE 5

| τ Value | Attribution | Intensity Ratio |
|---|---|---|
| 7.9 | —CH$_3$ | 10.0 |
| 6.2 | —CH$_2$— | 5.0 |
| 3.1–3.2 | (OH ring with H, H, CH$_3$) | 7.5 |
| 3.0 | (OH ring with H, CH$_3$) | |
| 1.75 | (OH ring with CH$_3$) | 3.0 |

EXAMPLE 1

A reaction vessel was charged with 100 g of a novolak type p-cresol/formaldehyde resin ($\overline{Mn}$=510) obtained according to the conventional process shown in Referential Example 1, 31.1 g of 2,6-dimethylol-p-cresol, 0.28 ml of 60% nitric acid and 100 ml of o-dichlorobenzene, and reaction was carried out at 175° C. for 4 hours under stirring. The reaction mixture was thrown into 1 l of methanol, and after removal of the unreacted substances, the reaction product was dried to obtain 120 g (the yield being 97%) of a resin. The number average molecular weight $\overline{Mn}$ was 5550 as measured according to the vapor pressure osmometry (in dimethylacetamide at 90° C.). The molecular weight distribution ($\overline{Mw}/\overline{Mn}$) of the resin as determined according to gel permeation chromatography was 6.2 and the melting point of the resin as measured by the microscopic method was higher than 300° C.

Data of $^1$H nuclear magnetic resonance spectrum of the resin as determined in pyridine-d$_5$ are shown in Table 5. From the data, the presence of the methylene proton of the methylol group in the vicinity of the τ

COMPARATIVE EXAMPLE 1

A reaction vessel was charged with 108 g (1 mole) of p-cresol, 168 g (1 mole) of 2,6-dimethylol-p-cresol, 540 ml of o-dichlorobenzene and 0.4 ml of 60% nitric acid, and reaction was carried out at 175° C. for 4 hours under stirring. The obtained resin was thrown into 5 l of methanol to remove the unreacted substances and the product was dried to obtain 87 g (the yield being 41%) of a resin. The number average molecular weight Mn of the resin as measured according to the vapor pressure osmometry was 1080, and the molecular weight distribution Mw/Mn as determined by gel permeation chromatography was 1.4. The melting point of the resin as determined according to the microscopic method was 230° C. When the structure of the resin was examined in the same manner as described in Example 1, it was found that the resin is a novolak type p-cresol/formaldehyde resin having a linear structure in which the p-cresol units and the methylene units are alternately arranged and a three-dimensional crosslinked structure (gelled portion) is not present.

EXAMPLES 2 THROUGH 4

Procedures of Example 1 were repeated in the same manner except that a novolak type o-cresol/formaldehyde, p-tert-butylphenol/formaldehyde or p-chlorophenol/formaldehyde resin shown in Table 6 was used instead of the novolak type p-cresol/formaldehyde resin used in Example 1. The number average molecular weight $\overline{M}n$ and structure of each of the obtained resins were determined according to the same methods as described in Example 1. It was found that each of the obtained resins is a novolak type substituted phenol/formaldehyde resin having a linear structure in which the phenol units and the methylene units are alternately arranged, as in the product of Example 1. Since each of these resins was completely dissolved in dimethylacetamide, it was confirmed that a three-dimensional cross-linked structure (gelled portion) is not present in any of the obtained resins. Properties of these resins are shown in Table 6.

TABLE 6

| Example No. | Starting Novolak Type Substituted Phenolic Resin | | Formed Resin | | Properties of Formed Resin | | | |
|---|---|---|---|---|---|---|---|---|
| | Kind | $\overline{M}n$ | Amount (g) | Amount (g) | Yield (%) | $\overline{M}n$ | $\overline{M}w/\overline{M}n$ | Melting Point (°C.) | Structure |
| 2 | o-cresol/formaldehyde resin | 550 | 100 | 121 | 100 | 1930 | 3.23 | 134 | Linear |
| 3 | p-tert-butylphenol/formaldehyde resin | 450 | 104 | 125 | 100 | 2510 | 1.70 | 200 | " |
| 4 | p-chlorophenol/formaldehyde resin | 430 | 104 | 120 | 96 | 2100 | 1.88 | 230 | " |

Note: header row has columns: Kind, $\overline{M}n$, Amount (g), Amount (g), Yield (%), $\overline{M}n$, $\overline{M}w/\overline{M}n$, Melting Point (°C.), Structure.

EXAMPLES 5 AND 6

Procedures of Example 1 were repeated in the same manner except that 100 g of the novolak type m-cresol/p-cresol/formaldehyde copolycondensed resins prepared according to the methods described in Referential Examples 5 and 6 were used. The structures of the obtained resins were determined according to the method described in Referential Example 5. It was found that each of the obtained resins is a novolak type substituted phenol/formaldehyde resin having a linear structure in which both the p-phenol and m-phenol units are contained as the phenol units, and these phenol units and the methylene units are alternately arranged and branches are present in parts of the m-phenol units. Since each of these resins was completely dissolved in dimethylacetamide, it was confirmed that a gelled portion, that is, a three-dimensional cross-linked structure, is not present in any of these resins. The obtained results are shown in Table 7.

TABLE 7

| Example No. | Starting Novolak Type Phenol/Formaldehyde Resin | | | Amount (g) of Formed Resin | Properties of Formed Resin | | | | Melting Point (°C.) | Structure |
|---|---|---|---|---|---|---|---|---|---|---|
| | Kind | Phenol Composition (mole %) p-cresol | m-cresol | $\overline{M}n$ | | Phenol Composition (mole %) p-cresol | m-cresol | $\overline{M}n$ | $\overline{M}w/\overline{M}n$ | | |
| 5 | m-cresol/p-cresol/formaldehyde copolycondensed resin prepared in Referential Example 5 | 88 | 12 | 380 | 112 | 89 | 11 | 2190 | 4.7 | 72.80 | partially branched linear structure |
| 6 | m-cresol/p-cresol/formaldehyde copolycondensed resin prepared in Referential Example 6 | 76 | 24 | 550 | 105 | 79 | 21 | 2310 | 4.8 | 72.80 | partially branched linear structure |

EXAMPLES 7 THROUGH 9

The novolak type p-cresol/formaldehyde resin ($\overline{M}n = 510$, $\overline{M}w/\overline{M}n = 1.4$, melting point = 83° C.) obtained according to the method described in Referential Example 1 and 2,6-dimethylol-p-cresol were mixed as shown in Table 8, and the mixture was charged in an autoclave together with 0.03 ml of 60% nitric acid and 100 ml of toluene and reaction was carried out at 175° C. for 4 hours under stirring. The reaction mixture was thrown in 500 ml of methanol to precipitate the resin, and the recovered product was dried to obtain a high-molecular-weight resin. The number average molecular weights $\overline{M}n$, molecular weight distributions $\overline{M}w/\overline{M}n$ and structures of the obtained resins were determined in the same manner as described in Example 1. Since each of these resins was completely dissolved in dimethylacetamide, it was confirmed that a three-dimensional crosslinked structure (gelled portion) is not present in any of the obtained resins. Basic properties of the obtained resin are shown in Table 8.

TABLE 8

| | Starting Materials | | | | | | |
|---|---|---|---|---|---|---|---|
| | Novolak Type p-Cresol/ | | Terminal 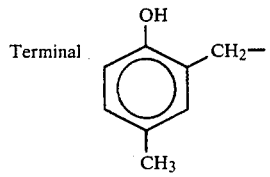 Unit/—CH₂OH Group Molar Ratio | Yield (g) of Polymer | Properties of Formed Resin | | |
| Example No. | Formaldehyde Resin (g) | 2,6-Dimethylol- p-Cresol (g) | | | $\bar{M}n$ | $\bar{M}w/\bar{M}n$ | Melting Point (°C.) | Structure |
| 7 | 40 | 10 | 0.8 | 42 | 2200 | 4.4 | >300 | linear |
| 8 | 40 | 12.4 | 0.1 | 46 | 3500 | 5.8 | >300 | linear |
| 9 | 40 | 14.8 | 1.2 | 50 | 2400 | 4.9 | >300 | linear |

EXAMPLE 10

A reaction vessel was charged with 108 g (1 mole) of p-cresol, 162 g (2 moles as HCHO) of 37% formalin and 4 g (0.1 mole) of sodium hydroxide, and reaction was carried out at 80° C. for 4 hours. The reaction mixture was cooled to room temperature, neutralized with 2 N hydrochloric acid and washed with water to obtain 98 g of a resol type p-cresol/formaldehyde resin. The number average molecular weight $\bar{M}n$ of the obtained resin was 330 as determined according to the vapor pressure osmometry in dimethylacetamide at 90° C.

A reaction vessel was charged with 18 g of the so obtained resol type p-cresol/formaldehyde resin, 40 g of the novolak type p-cresol/formaldehyde resin obtained in Comparative Example 1, 40 ml of o-dichlorobenzene and 0.03 ml of 60% nitric acid, and reaction was carried out at 175° C. for 4 hours. The reaction mixture was thrown into 500 ml of methanol to precipitate the resin and the recovered product was dried to obtain 54 g of a resin. The number average molecular weight $\bar{M}n$ of the obtained resin was 2800 as determined according to the vapor pressure osmometry in dimethylacetamide at 90° C., and the molecular weight distribution $\bar{M}w/\bar{M}n$ of the resin as determined according to gel permeation chromatography was 3.4. The melting point of the resin as determined according to the microscopic method was higher than 300° C. Since the resin was completely dissolved in dimethylacetamide, it was confirmed that a three-dimensional crosslinked structure (gelled portion) is not present.

EXAMPLES 11 THROUGH 13

Procedures of Example 10 were repeated in the same manner except that the reaction temperature was changed as indicated in Table 9. The number average molecular weight $\bar{M}n$, the molecular weight distribution $\bar{M}w/\bar{M}n$ and melting point of each of the obtained resins were determined in the same manner as described in Example 10 to obtain results shown in Table 9.

TABLE 9

| | Reaction | | Properties of Formed Resin | | | |
|---|---|---|---|---|---|---|
| Example No. | Temperature (°C.) | Yield (g) of Resin | $\bar{M}n$ | $\bar{M}w/\bar{M}n$ | Melting Point (°C.) | Structure |
| 11 | 150 | 50 | 2400 | 3.2 | >300 | linear |
| 12 | 200 | 54 | 3200 | 3.5 | >300 | " |
| 13 | 225 | 55 | 3400 | 3.8 | >300 | " |

EXAMPLE 14

A reaction vessel was charged with 31 g of the resol type p-cresol/formaldehyde resin obtained according to the method described in Example 10, 10.8 g (0.1 mole) of p-cresol, 40 ml of o-dichlorobenzene and 0.15 ml of 60% nitric acid, and reaction was carried out at 175° C. for 4 hours. The reaction mixture was thrown into 500 ml of methanol to precipitate a resin, and the recovered product was dried to obtain 36 g of a resin. The number average molecular weight $\bar{M}n$ of the obtained resin was 2800 as determined according to the vapor pressure osmometry in dimethylacetamide at 90° C., and the molecular weight distribution $\bar{M}w/\bar{M}n$ of the resin as determined according gel permeation chromatography was 3.2. The melting point of the resin was higher than 300° C. as determined according to the microscopic method. The structure of the obtained resin was examined in the same manner as described in Example 1. It was found that the obtained resin has a linear structure in which the p-cresol units and the methylene units are alternately arranged. Since the resin was completely dissolved in dimethylacetamide and the like, it was confirmed that a three-dimensional crosslinked structure (gelled portion) is not present.

COMPARATIVE EXAMPLE 2

A reaction vessel equipped with a thermometer, a stirrer and a reflux cooler was charged with 94 g (1 mole) of phenol, 70 g (0.86 mole) of 37% formalin and 1 ml (0.274 millimole) of 1% by weight hydrochloric acid, and the mixture was heated and stirred and reaction was conducted for 4 hours from the point of initiation of refluxing. Then, 1 g (5.3 millimoles) of p-toluenesulfonic acid was added to the reaction mixture and a device for dehydration under reduced pressure was attached to the reaction vessel. Removal of water and phenol was conducted under heating under a reduced pressure of 10 mmHg until the temperature of the reaction product was 180° C. As the result, 88 g (the yield being 84%) of a brown solid resin was obtained. It was found that 36% by weight of the obtained resin is insoluble in N,N-dimethylacetamide and the resin contains a gelled portion (three-dimensional crosslinked structure). It also was found that the remaining 74% by weight of the resin is soluble in N,N-dimethylacetamide and consists of a novolak type phenol/formaldehyde resin having a branched chain structure. The average molecular weight $\bar{M}n$ of this branched novolak type phenol/formaldehyde resin was 1090 as determined according to the vapor pressure osmometry.

COMPARATIVE EXAMPLE 3

A reaction vessel equipped with a thermometer, a stirrer and a reflux cooler was charged with 94 g (1 mole) of phenol, 70 g (0.86 mole) of 37% formalin and 1 ml (0.274 millimole) of 1% by weight hydrochloric acid, and the mixture was heated and stirred and reaction was conducted for 4 hours from initiation of refluxing. Then, 1 g (5.3 millimoles) of p-toluene-sulfonic acid was added to the reaction mixture and a device for dehydration under reduced pressure was attached to the reaction vessel. Removal of water and phenol was conducted under heating under a reduced pressure of 10 mmHg until the temperature of the reaction product was 180° C. and removal of water and phenol was then conducted for another 30 minutes. As the result, 70 g (the yield being 67%) of a brown solid resin was obtained. It was found that 58% by weight of the obtained resin is insoluble in N,N-dimethylacetamide and the resin contains a gelled portion (three-diemensional crosslinked structure). It also was found that the remaining 42% by weight of the resin is soluble in N,N-dimethylacetamide and consists of a novolak type phenol/formaldehyde resin having a branched chain structure. The average molecular weight $\overline{M}n$ of this branched novolak type phenol/formaldehyde resin was 470 as determined according to the vapor pressure osmometry.

COMPARATIVE EXAMPLE 4

A reaction vessel equipped with a thermometer, a stirrer and a reflux cooler was charged with 108 g (1 mole) of p-cresol, 70 g (0.86 mole) of 37% formalin and 1 ml (0.274 millimole) of 1% by weight hydrochloric acid, and the mixture was heated and stirred and reaction was conducted for 4 hours from initiation of refluxing. Then, 1 g (5.3 millimoles) of p-toluene-sulfonic acid was added to the reaction mixture and a device for dehydration under reduced pressure was attached to the reaction vessel. Removal of water and p-cresol was conducted under heating under a reduced pressure of 10 mmHg until the temperature of the reaction product was 180° C. As the result, 89 g (the yield being 75%) of a brown solid resin was obtained. Since the obtained resin was completely dissolved in N,N-dimethylacetamide, it was confirmed that the resin is free of a three-dimensional crosslinked structure (gelled portion). It was confirmed that the obtained resin is a novolak type p-cresol/formaldehyde resin having a linear molecular structure. The number average molecular weight $\overline{M}n$ of the obtained resin was 670 as determined according to the vapor pressure osmometry.

EXAMPLE 15

An autoclave having a capacity of 500 ml was charged with 100 g of the novolak type p-cresol/formaldehyde resin ($\overline{M}n = 510$) prepared according to the method illustrated in Referential Example 1, 27.6 g of p-xylylene glycol, 0.28 ml of 60% nitric acid and 270 ml of toluene, and reaction was carried out at 175° C. under stirring for 4 hours. The reaction mixture was dissolved in 1 l of methanol to remove unreacted substances, and the reaction product was dried to obtain 72 g (the yield being 60%). The number average molecular weight $\overline{M}n$ of the obtained resin was 2000 as determined according to the vapor pressure osmometry in dimethylacetamide at 90° C., and the molecular weight distribution $\overline{M}w/\overline{M}n$ of the resin was 2.5 as determined according to gel permeation chromatography. The melting point of the resin was higher than 300° C. as determined according to the microscopic method. The structure of the resin was examined in the same manner as described in Referential Example 1. It was found that the resin has a novolak type p-cresol/formaldehyde resin skeleton. Since a high-molecular-weight resin different from the starting resin was formed, it was confirmed that the starting low-molecular-weight novolak type p-cresol/formaldehyde resin was reacted with p-xylylene glycol and the molecular weight was increased by alternate arrangement and connection of the starting novolak type p-cresol/formaldehyde units and p-xylylene units, and that novolak type p-cresol/formaldehyde resin units were connected to the molecule terminals of the formed resin. Since the formed resin was completely dissolved in dimethylacetamide, tetrahydrofuran and the like, it was confirmed that the formed resin is free of a three-dimensional crosslinked structure (gelled portion) and is substantially linear.

EXAMPLES 16 THROUGH 23

Procedures of Example 15 were repeated in the same manner except that a chain extender shown in Table 10 was used instead of p-xylylene glycol used in Example 15. The number average molecular weights $\overline{M}n$ and structures of the obtained resins were determined according to the methods described in Example 15. In each of the obtained resins, it was confirmed that the molecule terminals of the starting novolak type p-cresol/formaldehyde resin were reacted with the chain extender shown in Table 10 and the molecular weight was increased by alternate arrangement and connection of the novolak type p-cresol/formaldehyde resin units and the units of the chain extender shown in Table 10. It also was confirmed that the novolak type p-cresol/formaldehyde resin units were connected to the molecule terminals of the formed resin. Since the formed resin was completely dissolved in dimethylacetamide, tetrahydrofuran and the like, it was confirmed that each of the formed resins is free of a three-dimensional crosslinked structure (gelled portion) and is substantially linear. Properties of the obtained resins are shown in Table 10.

TABLE 10

| Example No. | Chain Extender Kind | Amount (g) | Formed Resin Amount (g) | Yield (%) | Chain Extender Unit | $\overline{Mn}$ | $\overline{Mw}/\overline{Mn}$ | Melting Point (°C) | Structure |
|---|---|---|---|---|---|---|---|---|---|
| 16 | ethylene glycol | 12.4 | 64 | 61 | $-CH_2CH_2-$ | 2000 | 2.5 | >300 | linear |
| 17 | acetone | 11.6 | 73 | 68 | $-C(CH_3)_2-$ | 2050 | 2.1 | >300 | " |
| 18 | p-xylylene dichloride | 35.0 | 79 | 62 | $-H_2C-C_6H_4-CH_2-$ | 2370 | 2.1 | >300 | " |
| 19 | propylene glycol | 16.0 | 73 | 68 | $-CH_2-CH(CH_3)-$ | 2100 | 2.1 | >300 | " |
| 20 | cyclohexylene glycol | 23.2 | 78 | 67 | cyclohexylene | 2400 | 2.6 | >300 | " |
| 21 | cyclohexanone | 18.6 | 71 | 62 | cyclohexylidene | 2100 | 2.1 | >300 | " |
| 22 | acetophenone | 23.2 | 72 | 60 | $-C(CH_3)(C_6H_5)-$ | 2050 | 2.1 | >300 | " |
| 23 | styrene dichloride | 35.0 | 78 | 65 | $-CH_2-CH(C_6H_5)-$ | 2200 | 2.4 | >300 | " |

EXAMPLES 24 THROUGH 26

Procedures of Example 15 were repeated in the same manner except that the novolak type o-cresol/formaldehyde resin obtained in Referential Example 2 (Example 24), the novolak type p-tert-butylphenol/formaldehyde resin obtained in Referential Example 3 (Example 25) and the novolak type p-chlorophenol/formaldehyde resin obtained in Referential Example 4 (Example 26) were used as shown in Table 11 instead of the novolak type p-cresol/formaldehyde resin used in Example 15. The number average molecular weights Mn and molecular weight distributions Mw/Mn of the obtained resins were determined in the same manner as described in Example 15. The structure of the formed resins were examined in the same manner as described in Example 15 and it was confirmed that in each of the obtained resins, the molecule terminals of the starting novolak type substituted phenol/formaldehyde resin were reacted with p-xylylene glycol and the molecular weight was increased by alternate arrangement and connection of the novolak substituted phenol/formaldehyde resin units and the p-xylylene units, and that the novolak type substituted phenol/formaldehyde resin units were connected to the molecule terminals of the formed resin. Since the obtained resins were completely dissolved in dimethylacetamide, tetrahydrofuran and the like, it was confirmed that each of the formed resins is free of a three-dimensional crosslinked structure (gelled portion) and is substantially linear. Properties of the so obtained resins are shown in Table 11.

TABLE 11

| Example No. | Starting Novolak Type Substituted Phenolic Resin Kind | $\overline{Mn}$ | Amount (g) | Formed Resin Amount (g) | Yield (%) | Chain Extender Unit | $\overline{Mn}$ | $\overline{Mw}/\overline{Mn}$ | Melting Point (°C) | Structure |
|---|---|---|---|---|---|---|---|---|---|---|
| 24 | o-cresol/formaldehyde resin | 550 | 100 | 72 | 60 | $-H_2C-C_6H_4-CH_2-$ | 1900 | 2.7 | 130 | linear |
| 25 | p-tert-butylphenol/formaldehyde resin | 450 | 104 | 78 | 63 | $-H_2C-C_6H_4-CH_2-$ | 2020 | 1.7 | 190 | linear |
| 26 | p-chlorophenol/formaldehyde resin | 430 | 104 | 80 | 64 | $-H_2C-C_6H_4-CH_2-$ | 2000 | 1.8 | 220 | linear |

EXAMPLES 27 AND 28

Procedures of Example 15 were repeated in the same manner except that 100 g of the novolak type m-cresol/p-cresol/formaldehyde copolycondensed resin obtained in Referential Example 5 or 6 was used. The structures of the obtained resins were examined in the same manner as described in Example 15. It was confirmed that in each of the obtained resins, a novolak type m-cresol/p-cresol/formaldehyde copolycondensed resin skeleton was present. Since a high-molecular-weight resin different from the starting resin was formed, it was confirmed that the starting low-molecular-weight novolak type m-cresol/p-cresol/formaldehyde copolycondensed resin was reacted with p-xylylene glycol, and that the molecular weight was increased by alternate arrangement and connection of the novolak type m-cresol/p-cresol/formaldehyde copolycondensed resin units and p-xylylene units. It also was found that the novolak type m-cresol/p-cresol/formaldehyde resin units were connected to the molecule terminals of the formed resin. Since these resins were completely dissolved in dimethylacetamide, tetrahydrofuran and the like, it was confirmed that each of these resins is free of a three-dimensional crosslinked structure (gelled portion) and is substantially linear. Properties of the obtained resins are shown in Table 12.

Data of $^1H$ nuclear magnetic resonance spectrum of the obtained resin as determined in pyridine-$d_5$ are shown in Table 13. Since the presence of the methylene proton in the vicinity of the $\zeta$ value of 5.3 was not observed, it was confirmed that the obtained resin is a novolak type p-cresol/formaldehyde resin having a linear structure in which no methylol group is present at the molecule terminals and the p-cresol units and methylene units are alternately arranged. Since the resin was completely dissolved in dimethylacetamide, it was confirmed that a three-dimensional crosslinked structure (gelled portion) is not included at all.

TABLE 13

| τ Value | Attribution | Intensity Ratio |
|---|---|---|
| 7.9 | —CH₃ | 10.0 |
| 6.2 | —CH₂— | 5.0 |
| 3.1–3.2 | 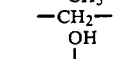 | 7.5 |
| 3.0 |  | |

TABLE 12

| Example No. | Starting Resin Kind | Mn | Formed Resin Amount (g) | Yield (%) | Chain Extender Unit | Properties of Formed Resin Mn | Mw/Mn | Melting Point (°C.) | Structure |
|---|---|---|---|---|---|---|---|---|---|
| 27 | m-cresol/p-cresol/ formaldehyde copolycondensed resin obtained in Referential Example 5 | 380 | 72 | 60 | —CH₂—⌬—CH₂— | 2010 | 2.8 | >280 | linear structure having branched chains |
| 28 | m-cresol/p-cresol/ formaldehyde copolycondensed resin obtained in Referential Example 6 | 550 | 78 | 63 | " | 2130 | 3.7 | >280 | linear structure having branched chains |

EXAMPLE 29

An autoclave having a capacity of 500 ml was charged with 100 g of the novolak type p-cresol/formaldehyde resin (Mn=510) obtained according to the customary method illustrated in Referential Example 1, 16.2 g of 37% formalin, 0.28 ml of 60% nitric acid and 270 ml of toluene, and reaction was carried out at 175° C. for 4 hours under stirring. The reaction mixture was thrown into 1 l of methanol to remove the unreacted substances, and the recovered product was dried to obtain 92 g (the yield being 74%) of a resin. The number average molecular weight Mn of the resin was 2020 as determined according to the vapor pressure osmometry, and the molecular weight distribution Mw/Mn as determined according to gel permeation chromatography was 21. The melting point of the resin was higher than 300° C. as determined according to the microscopic method.

1.75     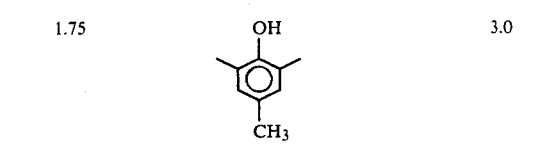     3.0

EXAMPLES 30 THROUGH 32

Procedures of Example 29 were repeated in the same manner except that a compound shown in Table 14 was used as the chain extender. The number average molecular weights Mn and structures of the obtained resins were determined in the same manner as described in Example 29. It was confirmed that each of the obtained resins is a novolak type substituted phenol/formaldehyde resin having a linear structure in which the phenol units and methylene units are alternately arranged, as in the product obtained in Example 29. Since these resins were completely dissolved in dimethylacetamide, it was confirmed that a three-dimensional crosslinked structure (gelled portion) is not included in any of the obtained results. Properties of these resins are shown in Table 14.

the physical properties of the molded product were determined to obtain results shown in Table 15.

TABLE 14

| | Chain Extender | | Formed Resin | | Properties of Formed Resin | | | | |
|---|---|---|---|---|---|---|---|---|---|
| Example No. | Kind | Amount (g) | Amount (g) | Yield (%) | Chain Extender Unit | $\overline{Mn}$ | $\overline{Mw}/\overline{Mn}$ | Melting Point (°C.) | Structure |
| 30 | 80% p-form- aldehyde | 7.5 | 84 | 68 | —CH$_2$— | 2000 | 2.0 | >300 | linear |
| 31 | 2,6-bis(chlo- romethyl)-p- cresol | 41 | 113 | 91 | 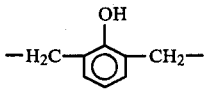 | 2060 | 2.9 | >300 | " |
| 32 | chloromethyl methyl ether* | 16.1 | 105 | 85 | —CH$_2$— | 2900 | 2.1 | >300 | " |

Note
*hydrolyzed in the presence of water to form formaldehyde

EXAMPLES 33 THROUGH 70 AND COMPARATIVE EXAMPLES 5 THROUGH 16

The high-molecular-weight novolak type substituted phenolic resins obtained in Examples 1 through 32 and novolak type substituted phenolic resins obtained in Referential Examples 1 through 7 were incorporated in setting type resins, and properties of the resulting setting resin compositions were examined and evaluated. The setting resin compositions used for evaluation of the properties were prepared according to any of the following methods [see Table 15].

METHOD (A) OF PREPARATION OF SETTING TYPE RESIN COMPOSITIONS

A mixture comprising 15 g of the novolak type substituted phenolic resin shown in Table 15, 25 g of a bisphenol A type epoxy resin (EPOMIK R-301 manufactured and supplied by Mitsui Petrochemical-Epoxy Co.), 150 g of fused silica, 0.25 g of a BF$_3$.2-methylimidazole complex and 0.75 g of a montanic acid wax was kneaded on a roll maintained at 80° C. for 7 minutes. After cooling, the kneaded mixture was pulverized to particles having a size of 7 to 100 mesh, and the pulverization product was press-molded in a mold maintained at 250° C. for 20 minutes under 100 Kg/cm$^2$ (actual pressure). The molded composition was post-cured at 250° C. for 30 minutes. The physical properties of the molded product were measured to obtain results shown in Table 15.

METHOD (B) OF PREPARATION OF SETTING TYPE RESIN COMPOSITIONS

A mixture comprising 15 g of the novolak type substituted phenolic resin shown in Table 15, 25 g of a bisphenol A type epoxy resin (EPOMIK R-301 manufactured and supplied by Mitsui Petrochemical-Epoxy Co.), 95 g of fused silica, 0.25 g of a BF$_3$.2-methylimidazole complex and 0.75 g of a montanic acid wax was kneaded on a roll maintained at 80° C. for 7 minutes. After cooling, the kneaded mixture was pulverized to particles having a size of 7 to 100 mesh, and the pulverized composition was press-molded in a mold maintained at 250° C. for 20 minutes under 100 Kg/cm$^2$ (actual pressure). The molded composition was post-cured for 30 minutes, and

METHOD (C) OF PREPARATION OF SETTING TYPE RESIN COMPOSITION

A mixture comprising 37 g of the high-molecular-weight p-cresol/formaldehyde resin shown in Table 15, 63 g of a bisphenol A type epoxy resin (EPOMIK R-140 manufactured and supplied by Mistui Petrochemical-Epoxy Co.) and 0.1 g of 2-methylimidazole was dissolved in a mixed solvent comprising 25 g of methylethyl ketone and 5 g of methanol, and a glass cloth (Glass Cloth WE-18K-BZ2 manufactured and supplied by Nittobo Co.) was impregnated with the so formed varnish and press-molded at 170° C. for 1 hour. The press-molded product was post-cured at 180° C. for 8 hours to obtain a laminate sheet. The flexural strength of the laminate sheet was measured at 21, 150° and 180° C. to obtain results shown in Table 15.

METHOD (D) OF PREPARATION OF SETTING TYPE RESIN COMPOSITIONS

A mixture comprising the novolak type substituted phenolic resin shown in Table 15, 25 g of a novolak type phenol-epoxy resin (Epoxylated Phenol Novolak EPPN-201 manufactured and supplied by Nippon Chemical Co.), 95 g of fused silica, 0.25 g of a BF$_3$.2-methylimidazole complex and 0.75 g of a montanic acid wax was kneaded on a roll maintained at 80° C. for 7 minutes. After cooling, the kneaded mixture was pulverized to particles having a size of 7 to 100 mesh, and the pulverized composition was press-molded in a mold maintained at 250° C. for 20 minutes under 100 Kg/cm$^2$ (actual pressure). The press-molded composition was post-cured at 250° C. for 30 minutes, and the physical properties of the obtained molded product were measured to obtain results shown in Table 15.

METHOD (E) OF PREPARATION OF SETTING TYPE RESIN COMPOSITIONS

A mixture comprising 15 g of the novolak type substituted phenolic resin shown in Table 15, 25 g of a bisphenol A type epoxy resin (EPOMIK R-301 manufactured and supplied by Mitsui Petrochemical-Epoxy Co.), 27 g of an inorganic filler shown in Table 15, 0.25 g of a BF$_3$.2-methylimidazole complex and 0.75 g of a montanic acid wax was kneaded on a roll maintained at 80°

C. for 7 minutes. After cooling, the kneaded composition was pulverized to particles having a size of 7 to 100 mesh, and the pulverized composition was press-molded in a mold maintained at 80° C. for 20 minutes under 100 Kg/cm$^2$ (actual pressure). The press-molded product was post-cured at 250° C. for 30 minutes, and the physical properties of the molded product were determined to obtain results shown in Table 15.

METHOD (F) OF PREPARATION OF SETTING TYPE RESIN COMPOSITIONS

A mixture comprising 100 g of the novolak type substituted phenolic resin shown in Table 15, 63 g of a bisphenol A type epoxy resin (EPOMIK R-140 manufactured and supplied by Mitsui Petrochemical-Epoxy Co.) and 1 g of a BF$_3$.2-methylimidazole complex was kneaded and press-molded in a mold maintained at 200° C. under 100 Kg/cm$^2$ (actual pressure) for 20 minutes. The press-molded composition was post-cured at 200° C. for 5 hours and reacted at 250° C. for 0.5 hour to form a cured molded product having physical properties shown in Table 15.

METHOD (G) OF PREPARATION OF SETTING TYPE RESIN COMPOSITIONS

A mixture comprising 40 g of the novolak type substituted phenolic resin shown in Table 15, 60 g of novolak type phenol-formaldehyde resin obtained in Comparative Example 2 (in Comparative Example 15, the novolak type substituted phenolic resin was not used, but 100 g of the novolak type phenol/aldehyde resin obtained in Comparative Example 2 was used), 10 g of hexamine as a curing agent, 67 g of wood flour as a filler and 1 g of stearic acid bisamide as an additive was sufficiently pulverized and blended and kneaded at 90° to 100° C. for 18 minutes to form a sheet. The sheet was pulverized and blended to form a molding material. The molding material was molded at 165° C. under 300 Kg/cm$^2$ for 5 minutes to obtain a molded product having physical properties shown in Table 15.

METHOD (H) OF PREPARATION OF SETTING TYPE RESIN COMPOSITIONS

A molding material composition was prepared by blending 70 g of the novolak type substituted phenolic resin shown in Table 15, 30 g of solid resol type phenol-formaldehyde resin prepared in Referential Example 8 illustrated hereinafter, 67 g of wood flour as a filler and 1 g of stearic acid bisamide as an additive. The composition was sufficiently pulverized and blended and roll-kneaded at 120° C. for 15 minutes. The obtained sheet was pulverized and blended, and the resulting molding material was molded at 180° C. under 300 Kg/cm$^2$ for 5 minutes to obtain a molded product having physical properties shown in Table 15.

REFERENTIAL EXAMPLE 8

A reaction vessel was charged with 100 g (1.1 moles) of phenol, 90 g (1.1 moles as HCHO) of 37% formalin and 0.5 g of 25% aqueous ammonia, and reaction was carried out under reflux at 90° to 100° C. for 1.5 hours. The temperature was lowered to room temperature, and the separated water layer was removed. The obtained precondensate emulsion was heated again at 90° to 110° C. and water was removed under reduced pressure. When the temperature of the reaction product was 110° C., the reaction product was taken out from the reaction vessel and cooled and solidified to obtain 100 g of a resin. From the results obtained according to the vapor pressure osmometry and gel permeation chromatography, it was found that the obtained resin had a number average molecular weight $\overline{M}n$ of 440, a weight average molecular weight $\overline{M}w$ of 740 and a molecular weight distribution $\overline{M}w/\overline{M}n$ of 1.69. The melting point of the resin was 105° C. as determined according to the microscopic method.

TABLE 15

| Example No. | Novolak Type Substituted Phenolic Resin | | | | Setting Resin | | |
|---|---|---|---|---|---|---|---|
| | Preparation Example No. | Kind | $\overline{M}n$ | Kind | Curing Promotor | Curing Agent |
| 33 | Example 1 | high-molecular-weight novolak type p-cresol/formaldehyde resin | 5550 | epoxy resin | BF$_3$.2-methyl-imidazole | — |
| Comparative Example 5 | Referential Example 1 | novolak type p-cresol/formaldehyde resin | 510 | epoxy resin | BF$_3$.2-methyl-imidazole | — |
| 34 | Example 1 | high-molecular-weight novolak type p-cresol/formaldehyde resin | 5550 | epoxy resin | BF$_3$.2-methyl-imidazole | — |
| 35 | Example 2 | high-molecular-weight novolak type o-cresol/formaldehyde resin | 1930 | epoxy resin | BF$_3$.2-methyl-imidazole | — |
| 36 | Example 3 | high-molecular-weight novolak type p-tert-butylphenol/formaldehyde resin | 2510 | epoxy resin | BF$_3$.2-methyl-imidazole | — |
| 37 | Example 4 | high-molecular-weight novolak type p-chlorophenol/formaldehyde resin | 2100 | epoxy resin | BF$_3$.2-methyl-imidazole | — |
| 38 | Example 5 | high-molecular-weight novolak type m-cresol/p-cresol/formaldehyde resin | 2190 | epoxy resin | BF$_3$.2-methyl-imidazole | — |
| Comparative Example 6 | Referential Example 1 | novolak type p-cresol/formaldehyde resin | 510 | epoxy resin | BF$_3$.2-methyl-imidazole | — |
| Compara- | Referential | novolak type o-cresol/formalde- | 550 | epoxy | BF$_3$.2-methyl- | — |

TABLE 15-continued

| | | | | | | |
|---|---|---|---|---|---|---|
| tive Example 7 | Example 2 | hyde resin | | resin | imidazole | |
| Comparative Example 8 | Referential Example 3 | novolak type p-tert-butylphenol/formaldehyde resin | 450 | epoxy resin | BF$_3$.2-methylimidazole | — |
| Comparative Example 9 | Referential Example 4 | novolak type p-chlorophenol/formaldehyde resin | 430 | epoxy resin | BF$_3$.2-methylimidazole | — |
| Comparative Example 10 | Referential Example 5 | novolak type m-cresol/p-cresol/formaldehyde copolycondensed resin | 380 | epoxy resin | BF$_3$.2-methylimidazole | — |
| Comparative Example 11 | Comparative Example 2 | novolak type phenol/formaldehyde resin | 1090 | epoxy resin | BF$_3$.2-methylimidazole | — |
| 39 | Example 1 | high-molecular-weight novolak type p-cresol/formaldehyde resin | 5550 | epoxy resin | BF$_3$.2-methylimidazole | — |
| 40 | " | high-molecular-weight novolak type p-cresol/formaldehyde resin | 5550 | epoxy resin | 2-methylimidazole | — |
| Comparative Example 12 | Referential Example 1 | novolak type p-cresol/formaldehyde resin | 510 | epoxy resin | BF$_3$.2-methylimidazole | — |
| 41 | Example 1 | high-molecular-weight novolak type p-cresol/formaldehyde resin | 5550 | epoxy resin | BF$_3$.2-methylimidazole complex | — |
| 42 | " | high-molecular-weight novolak type p-cresol/formaldehyde resin | 5550 | epoxy resin | BF$_3$.2-methylimidazole complex | — |
| 43 | " | high-molecular-weight novolak type p-cresol/formaldehyde resin | 5550 | epoxy resin | BF$_3$.2-methylimidazole complex | — |
| 44 | " | high-molecular-weight novolak type p-cresol/formaldehyde resin | 5550 | epoxy resin | BF$_3$.2-methylimidazole complex | — |
| Comparative Example 13 | Referential Example 1 | novolak type p-cresol/formaldehyde resin | 510 | epoxy resin | BF$_3$.2-methylimidazole complex | — |
| Comparative Example 14 | Comparative Example 2 | novolak type phenol/formaldehyde resin | 1090 | epoxy resin | BF$_3$.2-methylimidazole complex | — |
| 45 | Example 1 | high-molecular-weight novolak type p-cresol/formaldehyde resin | 5550 | novolak type phenol/formaldehyde resin | — | hexamine |
| 46 | Example 4 | high-molecular-weight novolak type p-chlorophenol/formaldehyde resin | 2100 | novolak type phenol/formaldehyde resin | — | " |
| Comparative Example 15 | Comparative Example 4 | novolak type phenol/formaldehyde resin | 1090 | novolak type phenol/formaldehyde resin | — | " |
| 47 | Example 1 | high-molecular-weight novolak type p-cresol/formaldehyde resin | 5550 | resol type phenol/formaldehyde resin complex | — | — |
| 48 | Example 4 | high-molecular-weight novolak type p-chlorophenol/formaldehyde resin | 2100 | resol type phenol/formaldehyde resin complex | — | — |
| Comparative Example 16 | Comparative Example 2 | novolak type phenol/formaldehyde resin | 1090 | resol type phenol/formaldehyde resin complex | — | — |
| 49 | Example 15 | high-molecular-weight novolak type p-cresol/formaldehyde resin | 2000 | epoxy resin | BF$_3$.2-methylimidazole | — |
| 50 | " | high-molecular-weight novolak type p-cresol/formaldehyde resin | 2000 | " | BF$_3$.2-methylimidazole | — |
| 51 | Example 16 | high-molecular-weight novolak type p-cresol/formaldehyde resin | 2000 | " | BF$_3$.2-methylimidazole | — |
| 52 | Example 17 | high-molecular-weight novolak type p-cresol/formaldehyde resin | 2050 | " | BF$_3$.2-methylimidazole | — |
| 53 | Example 18 | high-molecular-weight novolak type p-cresol/formaldehyde resin | 2370 | " | BF$_3$.2-methylimidazole | — |
| 54 | Example 19 | high-molecular-weight novolak type p-cresol/formaldehyde resin | 2100 | " | BF$_3$.2-methylimidazole | — |
| 55 | Example 20 | high-molecular-weight novolak type p-cresol/formaldehyde resin | 2400 | " | BF$_3$.2-methylimidazole | — |
| 56 | Example 21 | high-molecular-weight novolak type p-cresol/formaldehyde resin | 2100 | " | BF$_3$.2-methylimidazole | — |
| 57 | Example 22 | high-molecular-weight novo- | 2050 | " | BF$_3$.2-methyl- | — |

TABLE 15-continued

| No. | Example | Resin | Value | Middle | Catalyst | Other |
|---|---|---|---|---|---|---|
| | | lak type p-cresol/formaldehyde resin | | | imidazole | |
| 58 | Example 23 | high-molecular-weight novolak type p-cresol/formaldehyde resin | 2200 | " | BF₃.2-methylimidazole | — |
| 59 | Example 24 | high-molecular-weight novolak type o-cresol/formaldehyde resin | 1900 | " | BF₃.2-methylimidazole complex | — |
| 60 | Example 25 | high-molecular-weight novolak type p-tert-butylphenol/formaldehyde resin | 2020 | " | BF₃.2-methylimidazole complex | — |
| 61 | Example 26 | high-molecular-weight novolak-type p-chlorophenol/formaldehyde resin | 2000 | " | BF₃.2-methylimidazole complex | — |
| 62 | Example 27 | high-molecular-weight novolak type m-cresol/m-cresol/formaldehyde copolycondensed resin | 2010 | " | BF₃.2-methylimidazole complex | — |
| 63 | Example 15 | high-molecular-weight novolak type p-cresol/formaldehyde resin | 2000 | " | BF₃.2-methylimidazole complex | — |
| 64 | " | high-molecular-weight novolak type p-cresol/formaldehyde resin | 2000 | " | BF₃.2-methylimidazole complex | — |
| 65 | " | high-molecular-weight novolak type p-cresol/formaldehyde resin | 2000 | " | BF₃.2-methylimidazole complex | — |
| 66 | " | high-molecular-weight novolak type p-cresol/formaldehyde resin | 2000 | " | BF₃.2-methylimidazole complex | — |
| 67 | " | high-molecular-weight novolak type p-cresol/formaldehyde resin | 2000 | novolak type phenol/formaldehyde resin | — | hexamine |
| 68 | Example 26 | high-molecular-weight novolak type p-chlorophenol/formaldehyde resin | 2000 | novolak type phenol/formaldehyde resin | — | " |
| 69 | Example 15 | high-molecular-weight novolak type p-cresol/formaldehyde resin | 2000 | resol type phenol/formaldehyde resin | — | — |
| 70 | Example 26 | high-molecular-weight novolak type p-chlorophenol/formaldehyde resin | 2000 | resol type phenol/formaldehyde resin | — | — |

| Example No. | Filler | Setting Type Resin Preparation Method | Flexural Strength (Kg/cm) | Flexural Elasticity [(Kg/cm²) × 10⁻⁵] | Izod Impact Strength (Kg·cm/cm) | Rockwell Hardness (M) | Thermal Distortion Temperature (°C.) |
|---|---|---|---|---|---|---|---|
| 33 | fused silica | A | 1290 | 1.90 | 1.7 | 111 | 288 |
| Comparative Example 5 | fused silica | A | 890 | 1.97 | 1.5 | 105 | 101 |
| 34 | fused silica | B | 1212 | 1.32 | 1.6 | 110 | >250 |
| 35 | fused silica | B | 1215 | 1.24 | 1.7 | 112 | 172 |
| 36 | fused silica | B | 1050 | 1.20 | 1.6 | 111 | 175 |
| 37 | fused silica | B | 1420 | 1.43 | 1.6 | 113 | 195 |
| 38 | fused silica | B | 1180 | 1.18 | 1.6 | 110 | >250 |
| Comparative Example 6 | fused silica | B | 824 | 1.20 | 1.3 | 108 | 109 |
| Comparative Example 7 | " | B | 646 | 1.06 | 1.5 | 109 | 98 |
| Comparative Example 8 | " | B | 520 | 0.93 | 1.0 | 108 | 101 |
| Comparative Example 9 | " | B | 699 | 1.17 | 1.5 | 109 | 107 |
| Comparative Example 10 | " | B | 756 | 1.10 | 1.2 | 107 | 102 |
| Comparative Example 11 | " | B | 630 | 1.10 | 1.3 | 107 | 95 |
| 39 | " | D | 792(23° C.) 616(200° C.) | 1.20(23° C.) 0.76(200° C.) | 1.9 | 116 | >250 |
| 40 | glass cloth | C | 3700(21° C.) 2900(150° C.) 2200(180° C.) | — | — | — | — |
| Comparative | glass cloth | C | 4400(21° C.) | — | — | — | — |

TABLE 15-continued

| Example 12 | | | 1700(150° C.) 900(180° C.) | | | | |
|---|---|---|---|---|---|---|---|
| 41 | glass fiber | E | 1120 | 0.90 | 10.0 | 110 | >250 |
| 42 | asbestos | E | 720 | 0.70 | 3.0 | 110 | >250 |
| 43 | graphite | E | 640 | 0.60 | 1.6 | 110 | >250 |
| 44 | not added | F | 850 | 0.35 | 2.1 | — | 185 |
| Comparative Example 13 | " | F | 550 | 0.30 | 1.4 | — | 90 |
| Comparative Example 14 | " | F | 580 | 0.31 | 1.7 | — | 90 |
| 45 | wood flour | G | 1080 | — | 2.7 | — | 210 |
| 46 | " | G | 1010 | — | 2.6 | — | 200 |
| Comparative Example 15 | " | G | 820 | — | 2.6 | — | 160 |
| 47 | " | H | 1050 | — | 2.8 | — | 212 |
| 48 | " | H | 1040 | — | 2.6 | — | 210 |
| Comparative Example 16 | " | H | 800 | — | 2.6 | — | 158 |
| 49 | fused silica | A | 1180 | 1.90 | 1.7 | 110 | 280 |
| 50 | " | B | 1090 | 1.21 | 1.6 | 110 | >250 |
| 51 | " | B | 1050 | 1.80 | 1.8 | 102 | 240 |
| 52 | " | B | 1100 | 1.80 | 1.8 | 110 | >250 |
| 53 | " | B | 1180 | 1.90 | 1.7 | 110 | 288 |
| 54 | " | B | 1120 | 1.80 | 1.8 | 106 | 260 |
| 55 | " | B | 1210 | 2.00 | 1.7 | 112 | 286 |
| 56 | " | B | 1160 | 1.80 | 1.8 | 108 | 270 |
| 57 | " | B | 1200 | 2.00 | 1.6 | 111 | 284 |
| 58 | " | B | 1090 | 1.80 | 1.8 | 105 | 250 |
| 59 | " | B | 1090 | 1.20 | 1.7 | 112 | 168 |
| 60 | " | B | 950 | 1.05 | 1.6 | 111 | 170 |
| 61 | " | B | 1110 | 1.25 | 1.6 | 113 | 180 |
| 62 | " | B | 1050 | 1.13 | 1.6 | 110 | >250 |
| 63 | glass fiber | E | 830 | 0.80 | 11.0 | 108 | >250 |
| 64 | asbestos | E | 700 | 0.70 | 3.5 | 107 | >250 |
| 65 | graphite | E | 620 | 0.60 | 2.0 | 107 | >250 |
| 66 | not added | F | 830 | 0.33 | 2.1 | — | 182 |
| 67 | wood flour | G | 1060 | — | 2.9 | — | 206 |
| 68 | " | G | 1010 | — | 2.8 | — | 200 |
| 69 | " | H | 1030 | — | 2.6 | — | 210 |
| 70 | " | H | 1040 | — | 2.8 | — | 210 |

What we claim is:

1. A process for the preparation of high-molecular-weight novolak type substituted phenolic resins, which comprises reacting (A) a novolak type substituted phenolic resin composed of a phenol comprising 70 to 100 mole % of at least one bifunctional phenol represented by the following general formula (I):

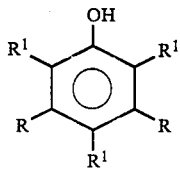
(I)

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, and 0 to 30 mole % of a trifunctional phenol and an aldehyde represented by the following general formula:

(II)

wherein $R^2$ stands for a hydrogen atom or a substituent selected from the group consisting of a methyl group and a halogenated methyl group, and having an hydroxyaryl unit at the molecule terminal and a number average molecular weight of from 250 to 1200, with (B) at least one dimethylolated product of said bifunctional and/or trifunctional phenol as a chain extender, in the presence of an acid catalyst, so that at least 70 mole % of the phenol component in the final novolak type substituted phenolic resin is occupied by said bifunctional phenol, until the number average molecular weight of the final novolak type substituted phenolic resin is at least 1500 as measured by vapor pressure osmometry in N,N-dimethylacetamide as the solvent, the ratio of the two reactants being such that the amount of the methylol group of the dimethylolated phenol is 0.5 to 1.5 equivalents per equivalent of the terminal hydroxyaryl unit of the starting novolak type substituted phenolic resin (A).

2. A process for the preparation of high-molecular-weight novolak type substituted phenolic resins, which comprises reacting (A) a novolak type substituted phenolic resin composed of a phenol comprising 70 to 100 mole % of at least one bifunctional phenol represented by the following general formula (I):

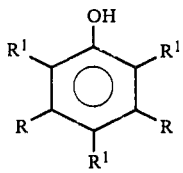

wherein two of three R¹'s are hydrogen atoms and the remaining one R¹ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, and 0 to 30 mole % of trifunctional phenol and an aldehyde represented by the following general formula:

$R^2$—CHO     (II)

wherein $R^2$ stands for a hydrogen atom or a substituent selected from the group consisting of a methyl group and a halogenated methyl group, and having an hydroxyaryl unit at the molecule terminal and a number average molecular weight of from about 250 to 1200, with (B) at least one resol type substituted phenolic resin composed of a phenol comprised mainly of said bifunctional phenol and said aldehyde and having a number average molecular weight of from 250 to 1200 as a chain extender, in the presence of an acid catalyst, so that at least 70 mole % of the phenol component in the final novolak type substituted phenolic resin is occupied by said bifunctional phenol until the number average molecular weight of the final novolak type substituted phenolic resin is at least 1500 as measured by vapor pressure osmometry in N,N-dimethylacetamide as the solvent, the ratio of the two reactants is such that the amount of the methylol group of the resol type substituted phenolic resin being 0.5 to 1.5 equivalents per equivalent of the terminal hydroxyaryl unit of the starting novolak type substituted phenolic resin (A).

3. A process for the preparation of high-molecular-weight novolak type substituted phenolic resins, which comprises reacting (A) a novolak phenolic type substituted resin composed of a phenol comprising 70 to 100 mole % of at least one bifunctional phenol represented by the following general formula (I):

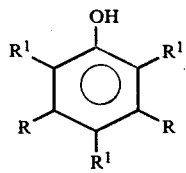

wherein two of three R¹'s are hydrogen atoms and the remaining one R¹ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, and 0 to 30 mole % of a trifunctional phenol and an aldehyde represented by the following general formula:

$R^2$—CHO     (II)

wherein $R^2$ stands for a hydrogen atom or a substituent selected from the group consisting of a methyl group and a halogenated methyl group, and having an hydroxyaryl unit at the molecule terminal and a number average molecular weight of from 250 to 1200, with (B) an aldehyde or ketone as a chain extender in the presence of an acid catalyst, so that at least 70 mole % of the phenol component in the final novolak type substituted phenolic resin is occupied by said bifunctional phenol, until the number average molecular weight of the final novolak type substituted phenolic resin is at least 1500 as measured by the vapor pressure osmometry in N,N-dimethylacetamide as the solvent, the ratio of the chain extender to the starting novolak type substituted phenolic resin (A) is such that the amount of the functional group of the chain extender being 0.5 to 1.5 equivalents per equivalent of the terminal hydroxyaryl unit of the starting novolak type substituted phenolic resin (A).

4. A process for the preparation of high-molecular-weight novolak type substituted phenolic resins, which comprises reacting (A) a novolak phenolic type substituted resin composed of a phenol comprising 70 to 100 mole % of at least one bifunctional phenol represented by the following general formula (I):

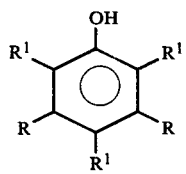

wherein two of three R¹'s are hydrogen atoms and the remaining one R¹ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, and 0 to 30 mole % of a trifunctional phenol and an aldehyde represented by the following general formula:

$R^2$—CHO     (II)

wherein $R^2$ stands for a hydrogen atom or a substituent selected from the group consisting of a methyl group and a halogenated methyl group, and having an hydroxyaryl unit at the molecule terminal and a number average molecular weight of from 250 to 1200, with (B) a diol or dihalide represented by the following general formula (XII):

X—Y—X     (XII)

wherein X stands for a hydroxyl group or a halogen atom, and Y stands for an alkylene group having 2 to 5 carbon atoms, an arylalkylidene group having 7 to 9 carbon atoms, an arylalkylene group having 8 to 10 carbon atoms or an arylene-bis-alkylene group having 8 to 10 carbon atoms, as a chain extender, in the presence of an acid catalyst, so that at least 70 mole % of the phenol component in the final novolak type substituted phenolic resin is occupied by said bifunctional phenol, until the number average molecular weight of the final novolak type substituted phenolic resin is at least 1500 as measured by vapor pressure osmometry in N,N-dimethylacetamide as the solvent, the ratio of the chain extender to the starting novolak type substituted phenolic resin (A) being such that the amount of the functional group of the chain extender is 0.5 to 1.5 equivalents per equivalent of the terminal hydroxyaryl unit of the starting novolak type substituted phenolic resin (A).

5. A process for the preparation of high-molecular-weight novolak type substituted phenolic resins, which comprises reacting (A) a phenol comprising 70 to 100 mole % of at least one bifunctional phenol represented by the following general formula (II):

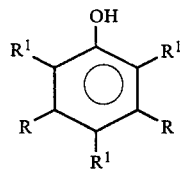
(I)

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group and two R's, which may be same or different, stand for a member selected from the group consisting of a hydrogen atom, an alkyl group having 1 to 8 carbon atoms, a halogen atom and a hydroxyl group, and 0 to 30 mole % of a trifunctional phenol, with (B) a resol type substituted phenolic resin composed of a phenol comprised mainly of said bifunctional phenol and an aldehyde represented by the formula (II):

$R^2$—CHO    (II)

wherein $R^2$ stands for a hydrogen atom or a substituent selected from the group consisting of a methyl group and a halogenated methyl group; and having a number average molecular weight of from 250 to 1200, in the presence of an acid catalyst, so that at least 70 mole % of the phenol component in the final novolak type substituted phenolic resin is occupied by said bifunctional phenol, until the number average molecular weight of the final novolak type substituted phenolic resin is at least 1500 as measured by vapor pressure osmometry in N,N-dimethylacetamide as the solvent, the ratio of the two reactants being such that the amount of the methylol group of the resol phenolic resin is 1 to 3 equivalents per mole of said phenol.

6. A process according to claim 1 or claim 3, wherein the acid catalyst is a protonic catalyst, boron trifluoride complex or aluminum trichloride.

7. A process according to claim 1 or claim 3, wherein the polycondensation reaction is carried out at a temperature of 100° to 250° C.

8. A process according to claim 1 or claim 3, wherein the acid catalyst is made present in an amount of 0.01 to 10 parts by weight per 100 parts by weight of the starting novolak type substituted phenolic resin or the starting resol type substituted phenolic resin.

9. A process according to claim 1 or claim 3, wherein the condensation reaction is conducted until the number average molecular weight of the resin is 1700 to 15,000.

10. A process according to claim 1 or claim 3, wherein the condensation reaction is conducted until the number average molecular weight of the resin is 2000 to 10,000.

11. A process according to claim 1, wherein the ratio of the dimethylolated phenol to the starting novolak type substituted phenolic resin is such that the amount of the methylol group of the dimethylolated phenol is 0.8 to 1.2 equivalents per equivalent of the hydroxyaryl unit at the molecule terminal of the starting novolak type phenolic resin.

12. A process according to claim 1, wherein the dimethylolated phenol is a dimethylolated phenol represented by the following general formula (VIII):

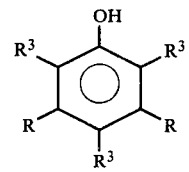
(VIII)

wherein two of three groups $R^3$ are groups

the remaining one group $R^3$ is a hydrogen atom, an alkyl group having 1 to 8 carbon atoms, an aryl group having 6 to 10 carbon atoms, a halogen atom or a hydroxyl group, $R^2$ stands for a hydrogen atom, a methyl group or a halogenated methyl group, and R stands for a hydrogen atom, an alkyl group having 1 to 8 carbon atoms, a halogen atom or a hydroxyl group.

13. A process according to claim 12, wherein in the dimethylolated phenol represented by the general formula (VIII), the remaining one group $R^3$ is a methyl, ethyl, isopropyl, sec-butyl or tert-butyl group and $R^2$ stands for a hydrogen atom.

14. A process according to claim 1, wherein the dimethylolated phenol comprises at least 80 mole % of a dimethylolated product of a phenol represented by the general formula (I) and up to 20 mole % of a dimethylolated product of a trifunctional group represented by the following general formula (III):

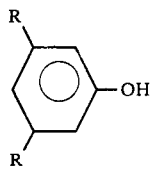

(III)

wherein R stands for a hydrogen atom, an alkyl group having 1 to 8 carbon atoms, a halogen atom or a hydroxyl group, and two R's may be the same or different.

15. A process according to claim 1, wherein the dimethylolated phenol is composed solely of a dimethylolated product of a bifunctional phenol represented by the general formula (I).

16. A process according to claim 1, wherein the dimethyloloated phenol is a dimethylolated cresol.

17. A process according to claim 2, wherein the ratio of the starting resol type substituted phenolic resin to the starting novolak type substituted phenolic resin is such that the amount of the methylol group of the resol type substituted phenolic resin is 0.8 to 1.2 equivalents per equivalent of the hydroxyaryl unit at the molecule terminal of the novolak type substituted phenolic resin.

18. A process according to claim 3, wherein the ratio of the chain extender to the starting novolak type substituted phenolic resin is such that the amount of the functional group of the chain extender is 0.8 to 1.2 equivalents per equivalent of the hydroxyaryl unit at the molecule terminal of the starting novolak type substituted phenolic resin.

19. A process according to claim 3, wherein the chain extender has a moleculer weight of 30 to 200.

20. A process according to claim 3, wherein the chain extender is an aliphatic aldehyde having up to 5 carbon atoms.

21. A process according to claim 3, wherein the chain extender is an aliphatic ketone having up to 6 carbon atoms.

22. A process according to, claim 1 or claim 3 wherein the phenol component constituting the starting novolak type substituted phenolic resin comprises 80 to 100 mole % of said bifunctional phenol and up to 20 mole % of a trifunctional phenol with the proviso that the total amount of both the phenols is 100 mole %.

23. A process according to claim 22, wherein the phenol component constituting the starting novolak type substituted phenolic resin comprises 90 to 100 mole % of said bifunctional phenol and up to 10 mole % of a trifunctional phenol with the proviso that the total amount of both the phenols is 100 mole %.

24. A process according to claim 22, wherein the starting novolak type substituted phenolic resin has a number average molecular weight of 350 to 1000.

25. A process according to claim 22, wherein the starting novolak type substituted phenolic resin has a number average molecular weight of 400 to 800.

26. A process according to claim 22, wherein the bifunctional phenol constituting the starting novolak type substituted phenolic resin is a bifunctional phenol represented by said general formula (I) wherein the remaining one group $R^1$ is methyl, ethyl, isopropyl, sec-butyl, tert-butyl or octyl groups.

27. A process according to claim 22, wherein the trifunctional phenol constituting the starting novolak type substituted phenolic resin is at least one trifunctional phenol represented by the following general formula (III):

wherein R stands for a hydrogen atom, an alkyl group having 1 to 8 carbon atoms, a halogen atom or a hydroxy group, and two R's may be the same or different.

28. A process according to claim 27, wherein the trifunctional phenol constituting the starting novolak type substituted phenolic resin is a trifunctional phenol represented by said general formula (III) wherein one of the two groups R is a hydrogen atom and the remaining one group R is a hydrogen atom or a methyl group, an ethyl group, an isopropyl group, a sec-butyl group, a tert-butyl group, an octyl group or a chlorine atom.

29. A process according to claim 1 or claim 3, wherein the aldehyde constituting the starting novolak type substituted phenolic resin is formaldehyde or acetaldehyde.

30. A process according to claim 5, wherein the ratio of the starting resol type substituted phenolic resin to the starting phenol is such that the amount of the methylol group of the starting resol type substituted phenolic resin is 1.6 to 2.4 equivalents per mole of said phenol.

31. A process according to claim 5, wherein the starting phenol comprises 80 to 100 mole % of said bifunctional phenol and up to 20 mole % of a trifunctional phenol with the proviso that the total amount of both the phenols is 100 mole %.

32. A process according to claim 5, wherein the phenol comprises 90 to 100 mole % of said bifunctional phenol and up to 10 mole % of a trifunctional phenol with the proviso that the total amount of both the phenols is 100 mole %.

33. A process according to claim 5, wherein the bifunctional phenol included in the starting phenol is a bifunctional phenol represented by said general formula (I) wherein the remaining one group $R^1$ is methyl, ethyl, isopropyl, sec-butyl, tert-butyl and octyl groups or a chlorine atom.

34. A process according to claim 5, wherein the trifunctional phenol included in the starting phenol is at least one trifunctional phenol represented by the following general formula (III):

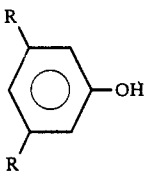

(III)

wherein R stands for a hydrogen atom, an alkyl group having 1 to 8 carbon atoms, a halogen atom or a hydroxyl group, and two R's may be the same or different.

35. A process according to claim 34, wherein the trifunctional phenol included in the starting phenol is a trifunctional phenol represented by said general formula (III) wherein one of the two groups R is a hydrogen atom and the remaining one group R is a hydrogen atom or a methyl group, an ethyl group, an isopropyl group, a sec-butyl group, a tert-butyl group, an octyl group or a chlorine atom.

36. A process according to claim 2 or claim 5, wherein the phenol component constituting the starting resol type substitutted phenol resin comprises 80 to 100 mole % of a bifunctional phenol represented by said general formula (I) and up to 20 mole % of a trifunctional phenol with the proviso that the total amount of both the phenols is 100 mole %.

37. A process according to claim 36, wherein the phenol component constituting the starting resol type substituted phenolic resin comprises 90 to 100 mole % of said bifunctional phenol and up to 10 mole % of a trifunctional phenol with the proviso that the total amount of both the phenols is 100 mole %.

38. A process according to claim 36, wherein the starting resol type substituted phenolic resin has a number average molecular weight of 350 to 1000.

39. A process according to claim 36, wherein the starting resol type substituted phenolic resin has a number average molecular weight of 400 to 800.

40. A process according to claim 36, wherein the bifunctional phenol constituting the starting resol type substituted phonolic resin is a bifunctional phenol represented by said general formula (I) wherein the remaining one group $R^1$ is a member selected from methyl, ethyl, isopropyl, sec-butyl, tert-butyl and octyl groups.

41. A process according to claim 36, wherein the trifunctional phenol constituting the starting resol type substituted phenolic resin is at least one trifunctional phenol represented by the following general formula (III):

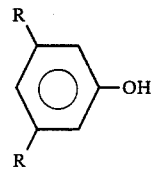

(III)

wherein R stands for a hydrogen atom, an alkyl group having 1 to 8 carbon atoms, a halogen atom or a hydroxyl group, and two R's may be the same or different.

42. A process according to claim 41, wherein the trifunctional phenol constituting the starting resol type substituted phenolic resin is a trifunctional phenol represented by said general formula (III) wherein one of two groups R is a hydrogen atom and the remaining one group R is a hydrogen atom or a methyl group, an ethyl group, an isopropyl group, a sec-butyl group, a tert-butyl group, an octyl group or a chlorine atom.

43. A process according to claim 36, wherein the aldehyde constituting the starting resol type substituted phenolic resin is formaldehyde or acetaldehyde.

44. A substantially linear, high-molecular-weight novolak type substituted phenolic resin having a polymer chain represented substantially by the following general formula (VII):

$$Z-Y_p-Z-_nY_p-Z \qquad (VII)$$

wherein Z represents a substantially linear novolak type recurring unit block having a number average molecular weight of from 250 to 1200 and which is the condensation reaction product of a phenol component consisting of 70 to 100 mole % of at least one bifunctional phenol represented by the following general formula (I):

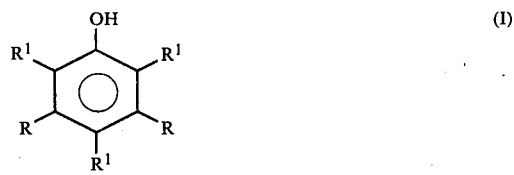

(I)

wherein two of three $R^1$'s are hydrogen atoms and the remaining one $R^1$ is an alkyl group having 1 to 8 carbon atoms, an aryl group having 6 to 10 carbon atoms, a halogen atom or a hydroxyl group, and two R's, which may be same or different, stand for a member selected from the group consisting of a hydrogen atom, an alkyl group having 1 to 8 carbon atoms, a halogen atom and a hydroxyl group, and 0 to 30 mole % of a trifunctional phenol with at least one aldehyde component represented by the following general formula (II)

$$R^2-CHO \qquad (II)$$

wherein $R^2$ represents a hydrogen atom or a substituent selected from the group consisting of a methyl group and a halogenated methyl group, Y represents an intervening group consisting of a divalent hydrocarbon group selected from alkylidene groups having 1 to 4 carbon atoms, alkylene groups having 2 to 5 carbon atoms, arylalkylidene groups having 7 to 9 carbon atoms, arylalkylene groups having 8 to 10 carbon atoms and arylene-bis-alkylene groups having 8 to 10 carbon atoms, which is present in an amount of 0.5 to 1 mole per mole of said blocks, p is a number of zero or 1, and n is zero or a number of at least 1.

said resin having a number average molecular weight of at least 1500 as measured by the vapor pressure osmometry in N,N-dimethylacetamide as the solvent.

45. A high-molecular-weight novolak type substituted phenolic resin as set forth in claim 44, wherein the number average molecular weight of said resin is 1700 to 15,000.

46. A high-molecular-weight novolak type substituted phenolic resin as set forth in claim 44, wherein the number average molecular weight of said resin is 2000 to 10,000.

47. A high-molecular-weight novolak type substituted phenolic resin as set forth in claim 44 or claim 45, wherein the molecular weight distribution $\overline{M}w/\overline{M}n$ expressed as the ratio of the weight average molecular weight $\overline{M}w$ to the number average molecular weight $\overline{M}n$ is in the range of from 1.8 to 20.

48. A high-molecular-weight novolak type substituted phenolic resin as set forth in claim 44 or claim 46, wherein the molecular weight distribution $\overline{M}w/\overline{M}n$ expressed as the ratio of the weight average molecular weight $\overline{M}w$ to the number average molecular weight $\overline{M}n$ is in the range of from 2.0 to 10.

49. A high-molecular-weight novolak type substituted phenolic resin as set forth in claim 44, wherein the phenol component constituting the novolak type substituted phenolic resin comprises 80 to 100 mole % of said bifunctional phenol and up to 20 mole % of a trifunctional phenol with the proviso that the total amount of both the phenols is 100 mole %.

50. A high-molecular-weight novolak type substituted phenolic resin as set forth in claim 44, wherein the phenol component constituting the novolak type substituted phenolic resin comprises 90 to 100 mole % of said bifunctional phenol and up to 10 mole % of a trifunctional phenol with the proviso that the total amount of both the phenols is 100 mole %.

51. A high-molecular-weight novolak type substituted phenolic resin as set forth in claim 44, wherein the bifunctional phenol constituting the novolak type substituted phenolic resin is a bifunctional phenol represented by said general formula (I) wherein the remaining one group $R^1$ is a member selected from methyl, ethyl, isopropyl, sec-butyl, tert-butyl and octyl groups.

52. A high-molecular-weight novolak type substituted phenolic resin as set forth in claim 44, wherein the trifunctional phenol constituting the novolak type substituted phenolic resin is at least one trifunctional phenol represented by the following general formula (III):

wherein R stands for a hydrogen atom, an alkyl group having 1 to 8 carbon atoms, a halogen atom or a hydroxyl group, and two R's may be the same or different.

53. A high-molecular-weight novolak type substituted phenolic resin as set forth in claim 52, wherein the trifunctional phenol constituting the novolak type substituted phenolic resin is a trifunctional phenol represented by said general formula (III) wherein one of two groups R is a hydrogen atom and the remaining one group R is a hydrogen atom or a methyl group, an ethyl group, an isopropyl group, a sec-butyl group, a tert-butyl group, an octyl group or a chlorine atom.

54. A high-molecular-weight novolak type substituted phenolic resin as set forth in claim 44, wherein the aldehyde component constituting the novolak type substituted phenolic resin is formaldehyde or acetaldehyde.

55. A high-molecular-weight novolak type substituted phenolic resin as set forth in claim 44, wherein the melting point of said resin is higher than 120° C.

56. A high-molecular-weight novolak type substituted phenolic resin as set forth in claim 44, wherein the melting point of said resin is higher than 150° C.

* * * * *

UNITED STATES PATENT AND TRADEMARK OFFICE
CERTIFICATE OF CORRECTION

PATENT NO. : 4,345,054
DATED : August 17, 1982
INVENTOR(S) : Takeda et al.

It is certified that error appears in the above—identified patent and that said Letters Patent is hereby corrected as shown below:

Claim 47, line 6, "Mn" should read --$\overline{\text{Mn}}$--.

Claim 44, line 5 should read:

$$Z\{Y_p-Z\}_n Y_p-Z \qquad (VII)$$

Signed and Sealed this

Twenth-eighth Day of September 1982

[SEAL]

Attest:

GERALD J. MOSSINGHOFF

Attesting Officer     Commissioner of Patents and Trademarks